(12) United States Patent
Shukla et al.

(10) Patent No.: US 8,594,747 B2
(45) Date of Patent: Nov. 26, 2013

(54) ADAPTIVE FAST DORMANCY IN A MOBILE DEVICE

(75) Inventors: Umesh K. Shukla, Sunnyvale, CA (US); Venkatasubramanian Ramasamy, San Jose, CA (US)

(73) Assignee: Apple Inc., Cupertino, CA (US)

( * ) Notice: Subject to any disclaimer, the term of this patent is extended or adjusted under 35 U.S.C. 154(b) by 173 days.

(21) Appl. No.: 13/102,472

(22) Filed: May 6, 2011

(65) Prior Publication Data

US 2012/0281561 A1 Nov. 8, 2012

(51) Int. Cl.
*H04B 1/38* (2006.01)

(52) U.S. Cl.
USPC .............. 455/573; 370/310.2; 455/127.5

(58) Field of Classification Search
USPC ........... 370/230, 252, 349, 310.2, 338, 395.2, 370/395.4
See application file for complete search history.

(56) References Cited

U.S. PATENT DOCUMENTS

| | | | |
|---|---|---|---|
| 8,306,519 B2 * | 11/2012 | Chan et al. | ................ 455/418 |
| 2008/0304510 A1 | 12/2008 | Qu | |
| 2009/0318199 A1 | 12/2009 | Barreto et al. | |
| 2010/0118752 A1 | 5/2010 | Suzuki et al. | |
| 2011/0026462 A1 | 2/2011 | Montojo et al. | |

OTHER PUBLICATIONS

Nokia Siemens Networks, Deutsche Telekom, Alcatel-Lucent, "*System Impact of Poor Proprietary Fast Dormancy Implementations*", 3GPP TSG-RAN meeting #45 RP-090941, Seville, Spain, Sep. 15-18, 2009.

* cited by examiner

*Primary Examiner* — Brenda H Pham
(74) *Attorney, Agent, or Firm* — Womble Carlyle Sandridge & Rice LLP

(57) ABSTRACT

Method, apparatus and computer program product to adapt the timing for releasing connections between a mobile wireless device and a wireless network is described. The mobile wireless device monitors data activity, and the value of a fast dormancy timer increases when data activity increases and decreases when data activity decreases. The mobile wireless device counts successive time intervals that include data activity and changes the value of the fast dormancy timer based on a preferred fast dormancy timer value related to the successive time interval count.

20 Claims, 17 Drawing Sheets

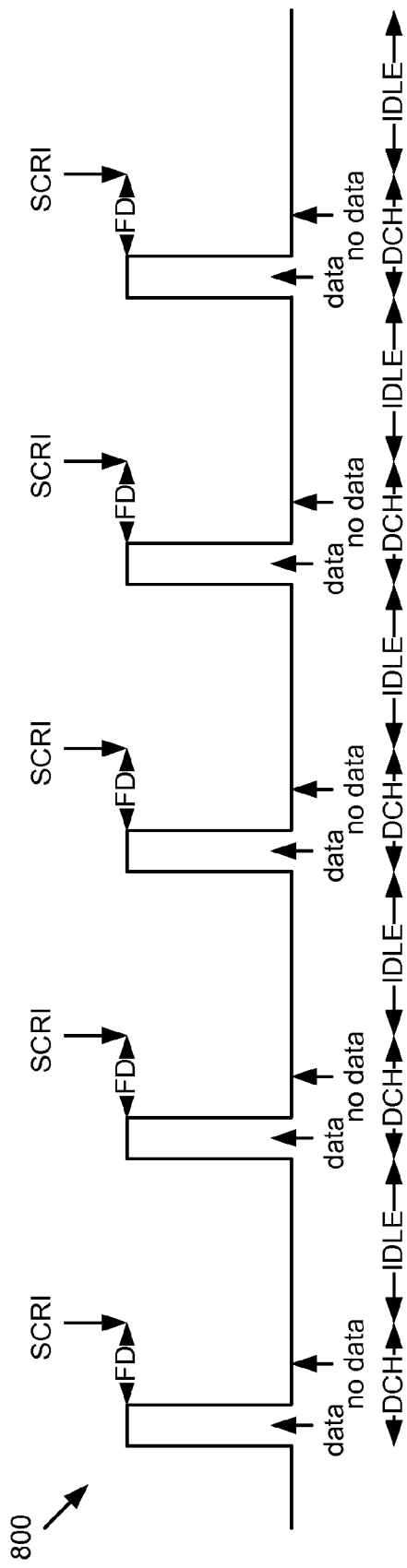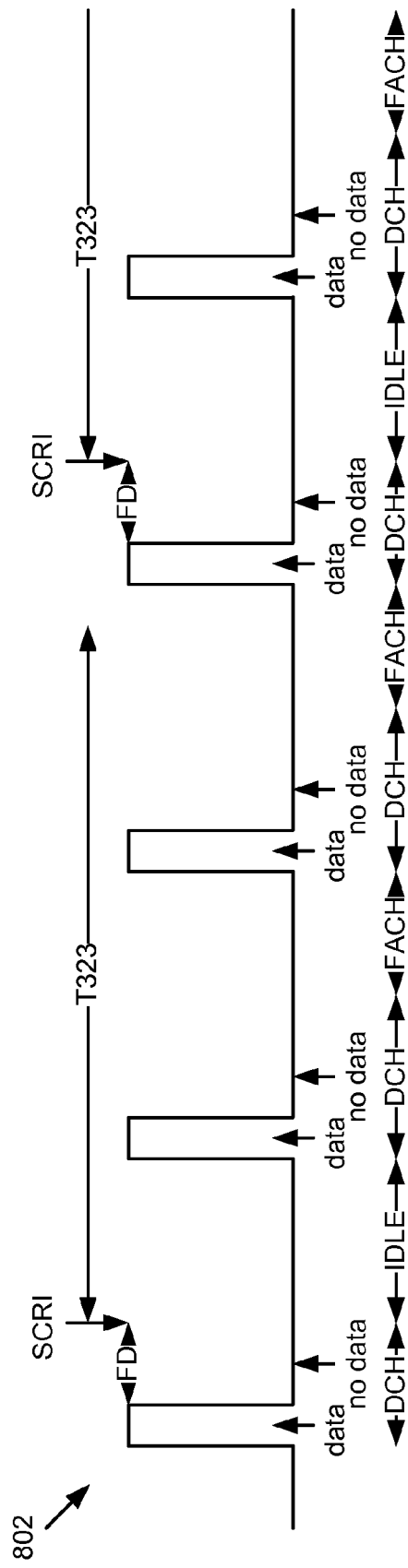
FIG. 8A
FIG. 8B

1300 

| Data Activity Count 1006 | Preferred FD Timer Value (Linear) 1302 | Preferred FD Timer Value (Exponential) 1304 | Preferred FD Timer Value (Constant) 1306 |
|---|---|---|---|
| 0 | default | default | default |
| 1 | default | default | default |
| 2 | 2(default) | (default)$^2$ | default + increment |
| n | n(default) | (default)$^n$ | default + (n-1)(increment) |

NOTE: A Preferred FD Timer Value Can Be Limited To The Minimum Of A Pre-Determined Maximum Value And A Value Given In This Table

FIG. 13

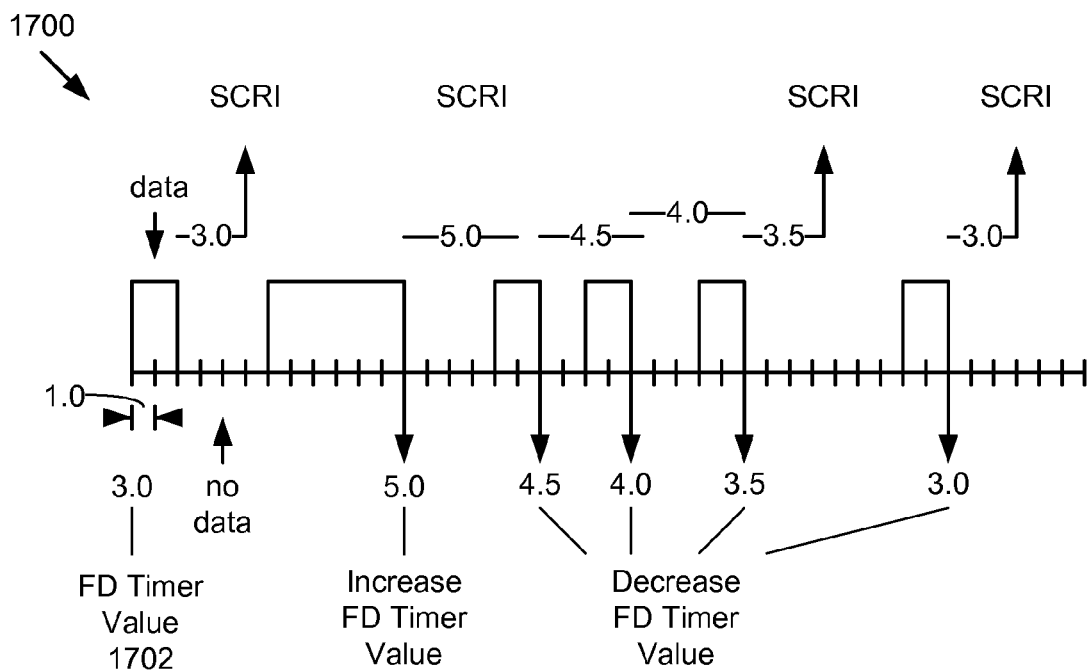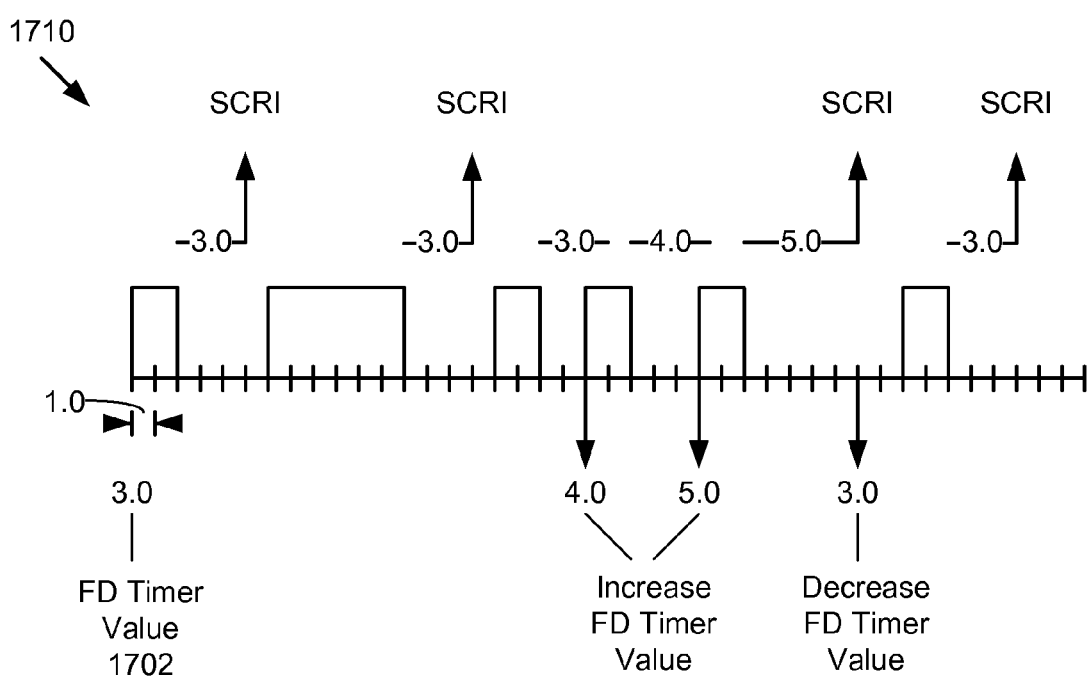
FIG. 17

ADAPTIVE FAST DORMANCY IN A MOBILE DEVICE

TECHNICAL FIELD

The present disclosure relates to radio resource control between User Equipment (UE) or other wireless or mobile device and a wireless network, and in particular to adaptive timing for transitions between states and modes of operation in a UE in communication with a wireless network such as a Universal Mobile Telecommunication System.

BACKGROUND

A Universal Mobile Telecommunication System (UMTS) is a broadband, packet based system for the transmission of text, digitized voice, video and multi-media. In a UMTS based network (or UTRAN, where UTRA stands for UMTS Terrestrial Radio Access), a Radio Resource Control (RRC) part of the protocol stack is responsible for the assignment, configuration and release of radio resources between the UE and the UTRAN. Two basic modes that the UE can operate are defined as "idle mode" and "UTRA RRC connected mode" (or simply "connected mode"). In idle mode, the UE is required to request a RRC connection from the UTRAN whenever it wants to send any user data or respond to a page for receiving data from an external data network such as a push server. When in a RRC connected mode, the UE can be in one of four states:

CELL-DCH: a dedicated channel is allocated to the UE in the uplink and downlink directions in this state to exchange data;

CELL_FACH: no dedicated channel is allocated to the UE in this state; instead, common channels are used to exchange a small amount of bursty data;

CELL_PCH: the UE uses Discontinuous Reception (DRX) to monitor broadcast messages and pages through a Paging Indicator Channel (PICH) and no uplink activity is possible; and URA_PCH: this state is similar to CELL_PCH, except that a UTRAN Registration Area (URA) UPDATE procedure is only triggered through URA reselection.

In the IDLE state, when the UE requests an RRC connection, the network (NW) decides whether to move the UE to the CELL_DCH or CELL_FACH state. Conversely, when the UE is in an RRC connected mode, the network can decide when to release the RRC connection. The network may move the UE from one RRC state to another before releasing the connection or instead of releasing the connection. The state transitions are typically triggered by data activity or inactivity between the UE and network. Since the network may not know when the UE has completed a data exchange for a given application, the network maintains the RRC connection for a pre-determined time period in anticipation of more data exchange with the UE. Maintaining the connection can reduce latency due to re-establishing a previously released connection that can require a call set-up and radio resource allocation. An RRC connection release message can be sent by the UTRAN to release the signal link connection and all radio resources between the UE and the UTRAN. The RRC connection release message can be sent in response to a Signaling Connection Release Indicator (SCRI) message sent to the network by the UE after a pre-determined period of inactivity. The length of time to wait before sending the message can be fixed by the network.

Sending the SCRI message to the network based on a fixed timer can be not optimized for variable rates of packet transmission between the UE and the network. The pre-determined period of inactivity set by the network can be not matched well to the frequency of data transmission to and from the UE, which can vary significantly for different applications. Sending the SCRI frequently can provide rapid release of radio resources benefiting the network and can conserve battery power at the UE; however, re-establishing an RRC connection can require additional signaling exchanges between the UE and the network. Sending the SCRI infrequently can provide an extended connection between the UE and the network; however, limited power storage at the UE can be drained unnecessarily during periods of data transmission inactivity, and radio resources can be assigned to the UE that could be used to other mobile devices served by the same UTRAN of the wireless network.

Therefore, a need exists for a method, apparatus, and system for adapting a time for releasing connections between a wireless mobile communication device and a wireless network to balance power consumption, radio resource allocation and signaling frequency.

SUMMARY OF THE DESCRIBED EMBODIMENTS

This paper describes various embodiments that relate to methods, apparatus and computer program product to adapt the timing for releasing connections between a mobile wireless communication device and radio network subsystems in a wireless communication network In one embodiment, a method of adapting a value for a fast dormancy timer in a wireless device in communication with a wireless network is described that includes at least the following steps. In a first step, the wireless device monitors data activity. In a subsequent step, the value of the fast dormancy timer increases when the data activity increases and decreases when data activity decreases. The fast dormancy timer controls when the wireless device requests to release a connection with the wireless network following a period of data inactivity. In an embodiment, monitoring data activity by the wireless device occurs in discrete time intervals and comprises at least the following steps. The wireless device determines a successive time interval count by counting a number of successive time intervals that include data activity. The wireless device maps the successive time interval count to a preferred fast dormancy timer value. The wireless device changes the value of the fast dormancy timer when the value of the fast dormancy timer differs from the preferred fast dormancy timer value. In various embodiments, the preferred fast dormancy timer value is related to the successive time interval count linearly, exponentially or by a constant offset.

In one embodiment, a mobile wireless device in communication with a wireless network is described. The mobile wireless device includes a processor and a wireless transceiver arranged to facilitate communication with the wireless network. The mobile wireless device is arranged to adapt a fast dormancy timer by the following steps. The mobile wireless device is arranged to monitor data activity and to increase a value of the fast dormancy timer when data activity increases and to decrease the value of the fast dormancy timer when data activity decreases. The value of the fast dormancy timer determines a period of data activity after which the mobile wireless device requests termination of a connection with the wireless network.

In one embodiment, a non-transitory computer program product for storing executable computer code for adapting a fast dormancy timer in a wireless device in communication with a wireless network is described. The computer program product comprises at least the following computer program code. Computer program code for monitoring data activity at the wireless device during a series of time intervals. Computer program code for determining a number of successive time intervals that include data activity. Computer program code for determining a preferred fast dormancy timer value for the wireless device based on the number of successive time intervals that include data activity. Computer program code for changing an actual fast dormancy timer value based on the determined preferred fast dormancy timer value.

In another embodiment, a method for adapting a value for a fast dormancy timer in a wireless device in communication with a wireless network is described. The method comprises at least the following steps performed at the wireless device. The wireless device senses a period of data inactivity. Following the sensing, the wireless device starts the fast dormancy timer. While the fast dormancy timer is running, the wireless device monitors for data activity and for expiration of the fast dormancy timer. When the fast dormancy timer expires during the period of data inactivity, the value of the fast dormancy timer is increased. When data activity occurs before the expiration of the fast dormancy timer, the value of the fast dormancy timer is decreased. The fast dormancy timer controls when the wireless device requests to release a connection with the wireless network.

BRIEF DESCRIPTION OF THE DRAWINGS

The described embodiments and the advantages thereof may best be understood by reference to the following description taken in conjunction with the accompanying drawings.

FIG. 8A and FIG. 8B illustrate data activity patterns, connection release requests and associated state changes for a UE in accordance with the described embodiments.

FIG. 13 illustrates a table of data activity counts and preferred fast dormancy timer values.

FIG. 17 illustrates two scenarios of adapting a fast dormancy timer based on measuring data activity and inactivity at a UE.

DETAILED DESCRIPTION OF EMBODIMENTS

Figure 1:
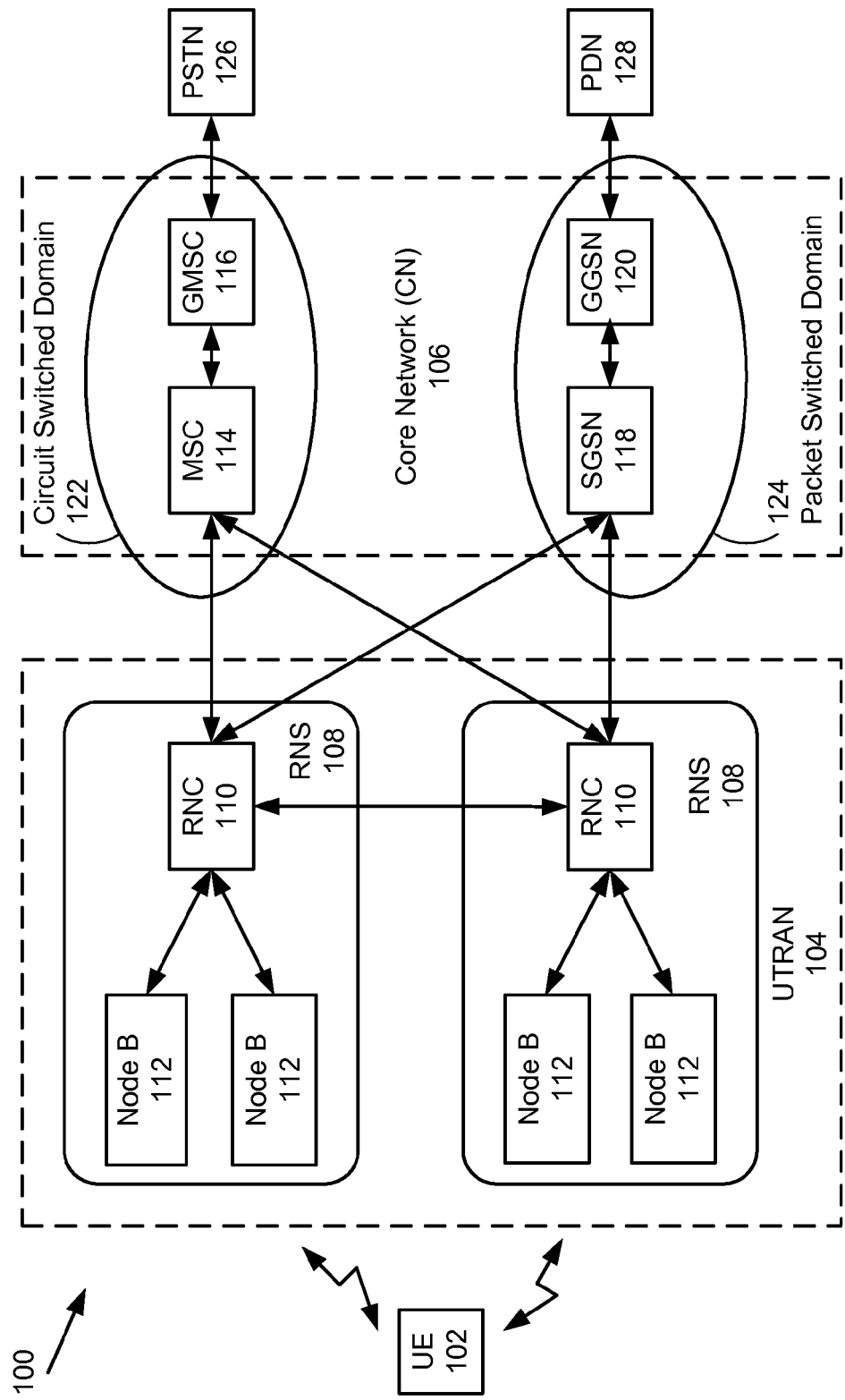
FIG. 1 illustrates representative components of a UMTS wireless network.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

The examples and embodiments provided below describe various methods and systems for adaptively transitioning a User Equipment (UE) or other mobile device between various states/modes of operation in a wireless network such as, for example, a UMTS network. It should be understood, however, that other implementations in other types of networks are also possible. For example, the same teachings could also be applied to a Code-Division-Multiple-Access (CDMA) network, Wideband-CDMA (W-CDMA) network, Long Term Evolution (LTE) network, or other network using packet wireless communications. In general, the teachings described herein can apply to a network based on radio access technology that utilizes network-controlled radio resources in which the network maintains no or limited knowledge of data activity at an application level in a device connected to the network. The specific examples and implementations described below although presented for simplicity in relation to UMTS networks are also applicable to these other network environments. Further, the network element is sometimes described below as the UTRAN. For other network types besides UMTS, the network elements can be selected appropriately based on the network type. Furthermore, the network element can be an element in the core network in a UMTS system or any other appropriate network system, where the network element is the entity that controls state transitions of a connected mobile device.

In a particular example, the present system and method provide for adapting values of a timer in a mobile wireless device based on monitored data activity at the mobile wireless device. The timer can affect when a state transition request message, such as a Signaling Connection Release Indication (SCRI) message can be sent by the mobile wireless device to the wireless network. The SCRI message can result in a transition by the UE (in response to messages received from the wireless network) from an RRC connected mode to a more battery efficient or radio resource efficient state or mode. The value of the timer can increase when data activity increase and decrease when data activity decreases, thereby adapting a time interval between the cessation of data activity at the mobile device and the transmission of an SCRI message to the wireless network that can result in a state transition. The value of the timer can increase and/or decrease linearly, exponentially or by constant values.

These and other embodiments are discussed below with reference to FIGS. 1-15. However, those skilled in the art will readily appreciate that the detailed description given herein with respect to these figures is for explanatory purposes only and should not be construed as limiting.

FIG. 1 illustrates a representative UMTS wireless communication network 100 that can include one or more user equipment (UE) 102 that can communicate with a UMTS terrestrial radio access network (UTRAN) 104 that can connect to a core network (CN) 106. The core network 106 can include a circuit switched domain 122 that can connect the UE 102 to a public switched telephone network (PSTN) 126 and a packet switched domain 124 that can connect the UE 102 to a packet data network (PDN) 128. The UTRAN 104 can include one or more radio network sub-systems (RNS) 108 each of which can include a radio network controller (RNC) 110 and one or more Node-Bs (base stations) 112 managed by the RNC 110. Multiple RNCs 110 within the UTRAN 104 can be interconnected to exchange control information and manage packets received from or destine to the UE 102. Each RNC 110 can handle the assignment and management of radio resources and can operate as an access point with respect to the core network 106. Node-Bs 112 can receive information sent by the physical layer of UE 102 through an uplink and transmit data to UE 102 through a downlink and can operate as access points of the UTRAN 104 for UE 102.

UTRAN 104 can construct and maintain a radio access bearer (RAB) for communication between UE 102 and the core network 106. In the described embodiments, the services provided to a specific UE 102 can include circuit switched (CS) services and packet switched (PS) services. For example, a general voice conversation can be transported through a circuit switched service, while a Web browsing application can provide access to the World Wide Web (WWW) through an internet connection that can be classified as a packet switched (PS) service. To support circuit switched services, RNCs 110 can connect to the mobile switching center (MSC) 114 of core network 106, and MSC 114 can be connected to gateway mobile switching center (GMSC) 116, which can manage connections to other networks, such as the PSTN 126. To support packet switched services, RNCs 110 can also be connected to serving general packet radio service (GPRS) support node (SGSN) 118, which can connect to gateway GPRS support node (GGSN) 120 of core network 106. SGSN 118 can support packet communications with RNCs 110 and GGSN 120 can manage connections with other packet switched networks, such as the PDN 128. A representative PDN 128 can be the "Internet".

Figure 2:
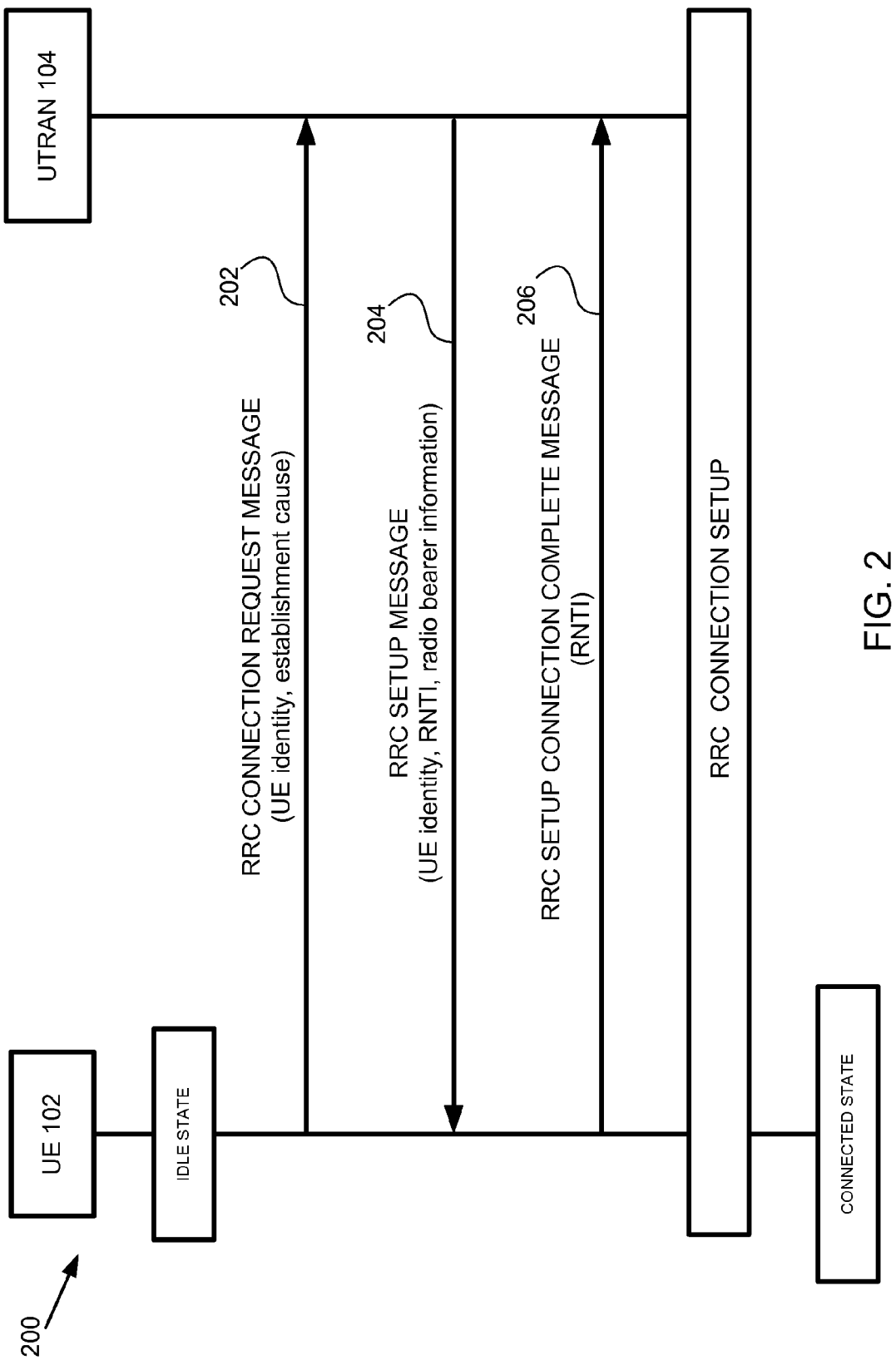
FIG. 2 illustrates a procedure when the UTRAN accepts an RRC connection request from a UE.

FIG. 2 illustrates a message exchange 200 when the UTRAN 104 can accept an RRC connection request from UE 102. When in an idle state, UE 102 can request to establish an RRC connection by first transmitting RRC connection request message 202 to the UTRAN 104. RRC connection request message 202 can include an RRC establishment cause and an initial UE identifier. The initial UE identifier, or UE identity, can uniquely identify a particular UE and can allow that UE to be identified irrespective of its geographic location. In response to RRC connection request 202, UTRAN 104 can transmit RRC connection setup message 204 to UE 102. RRC connection setup message 204 can include an RNTI (Radio Network Temporary Identity) and radio bearer setup information transmitted together with an initial UE identity. The RNTI can be a UE identifier allocated by the network to allow UTRAN 104 to identify connected state UEs. The RNTI can be used only when an RRC connection exists and can be used only within UTRAN 104. In response to RRC connection setup message, UE 102 can establish an RRC connection with UTRAN 104 and can transmit an RRC connection setup complete message 206 to the UTRAN 104. After the RRC connection has been established, UE 102 can use the RNTI instead of the initial UE identity when communicating with the UTRAN 104. The RRC connected state can refer to the existence of an established logical connection between the RRC of UE 102 and the RRC of the UTRAN 104. When there is a connection, UE 102 can be referred to as being in the RRC connected state. When there is no connection, UE 102 can be said to be in the idle state.

Figure 3:
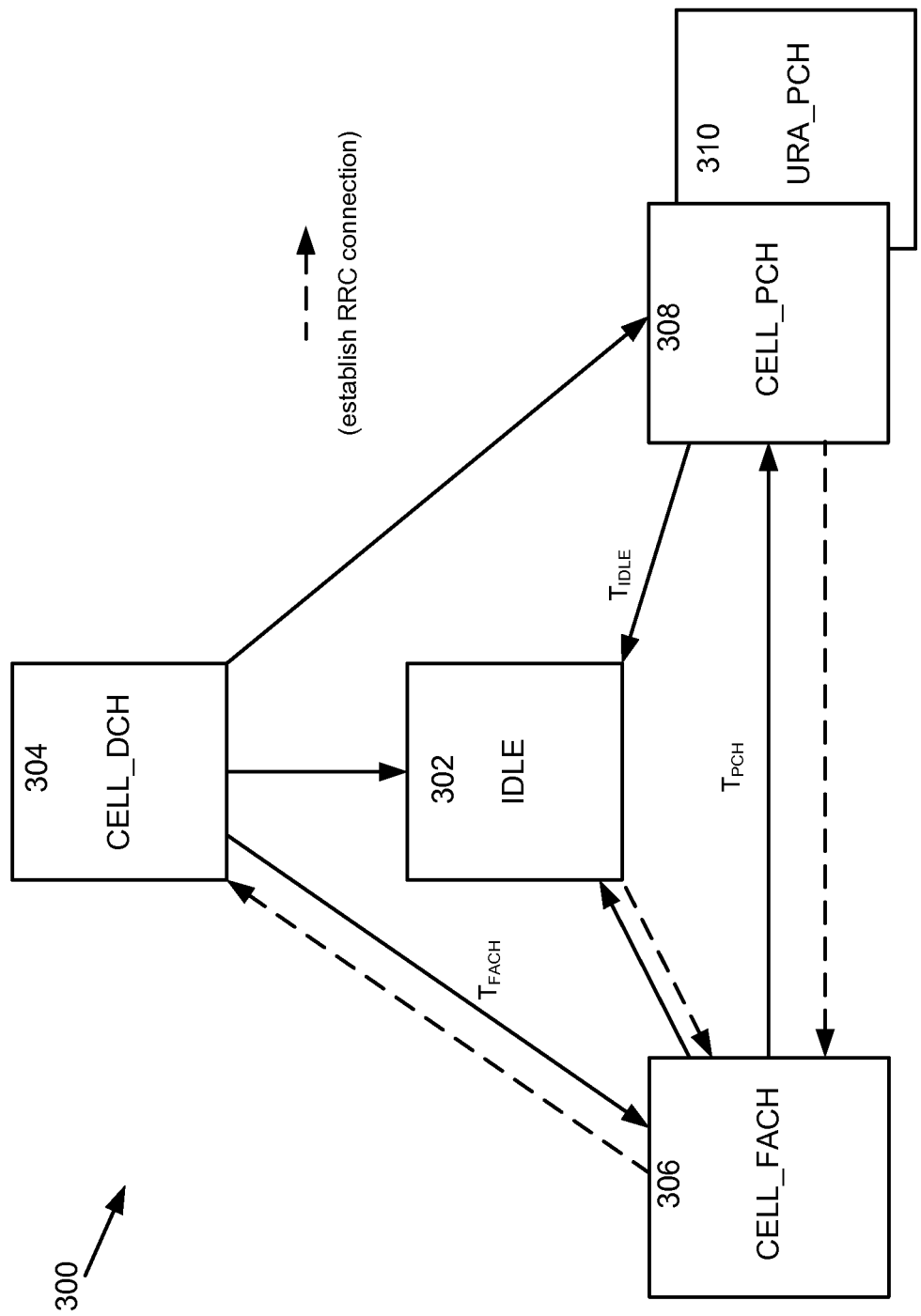
FIG. 3 is a block diagram illustrating several states for the radio resource control portion of a protocol stack in a UMTS network.

FIG. 3 illustrates a state transition diagram 300 that can include several states for the radio resource control (RRC) portion of a protocol stack for a UE 102 in a UMTS network. As discussed above, the UE 102 can be either in an RRC unconnected IDLE state 302 or in an RRC connected mode. In IDLE state 302, UE 102 can request an RRC connection to establish radio resources for communication with a wireless network whenever data is available to exchange between UE 102 and the UTRAN 104. Establishing the RRC connection can result because an application on UE 102 requires a connection to send data or retrieve data from the network, such as in a "pull" service. An RRC connection can also be established as a result of UE 102 receives a page on a paging channel when the UTRAN 104 or SGSN 118 indicating data to be sent from an external data network, such as in a "push" service. Once UE 102 has sent a request to UTRAN 104 to establish a radio connection, UTRAN 104 can choose a state for the RRC connection. Specifically, the RRC connected state can include four separate states, CELL_DCH state 304, CELL_FACH state 306, CELL_PCH state 308 and URA_PCH state 310. From IDLE state 302, UE 102 can transition to the CELL_FACH state 306, in which it can make an initial data transfer, subsequent to which the network can determine which RRC connected state to use for continued data transfer. The network can move UE 102 into the Cell Dedicated Channel (CELL_DCH) state 304 or keep UE 102 in the Cell Forward Access Channel (CELL_FACH) state 306. In CELL_DCH state 304, a dedicated channel can be allocated to UE 102 for both uplink and downlink to exchange data. The CELL_DCH state 304, with a dedicated physical channel allocated to UE 102, can typically consume more battery power from UE 102 than the other states, and significantly more battery power than the IDLE state 302. Alternatively, rather than place the UE 102 in the CELL_DCH state, UTRAN 104 can maintain UE 102 in a CELL_FACH state 306. In a CELL_FACH state 306 no dedicated channel can be allocated to UE 102. Instead, common channels can be used to send signaling in relatively small bursts of data. However, UE 102 can continue to monitor common channels in the CELL_FACH state 306, and therefore the UE 102 can consume more battery power than in select alternative states, namely CELL_PCH state 308 and URA_PCH state 410, as well as compared to IDLE state 302.

Within the RRC connected mode, the RRC state can be changed at the discretion of UTRAN 104. Specifically, if data inactivity is detected for an amount of time specific for each state transition $T_{state}$ (or data throughput below a certain threshold is detected) UTRAN 104 can move the RRC state from one state to another. For example, if data inactivity is detected for an amount of time $T_{FACH}$ then UTRAN 104 can move the RRC state from CELL_DCH state 304 to the CELL_FACH state 306. From CELL_FACH state 306, if data inactivity is detected for a predetermined time $T_{PCH}$, the UTRAN can move the RRC state from CELL_FACH state 306 to a CELL_PCH 308 or URA_PCH state 410. From CELL_PCH state 308 or URA_PCH state 310, UE 102 must move to CELL_FACH state 306 in order to initiate a CELL (or URA) Update procedure to request a dedicated channel and thereby move to the CELL_DCH state 304. The difference between CELL_PCH state 308 and URA_PCH state 310 is that the URA_PCH state 308 only triggers a URA update procedure if a UE's current UTRAN registration area (URA) is not among the list of URA identities present in the current cell.

Figure 4:
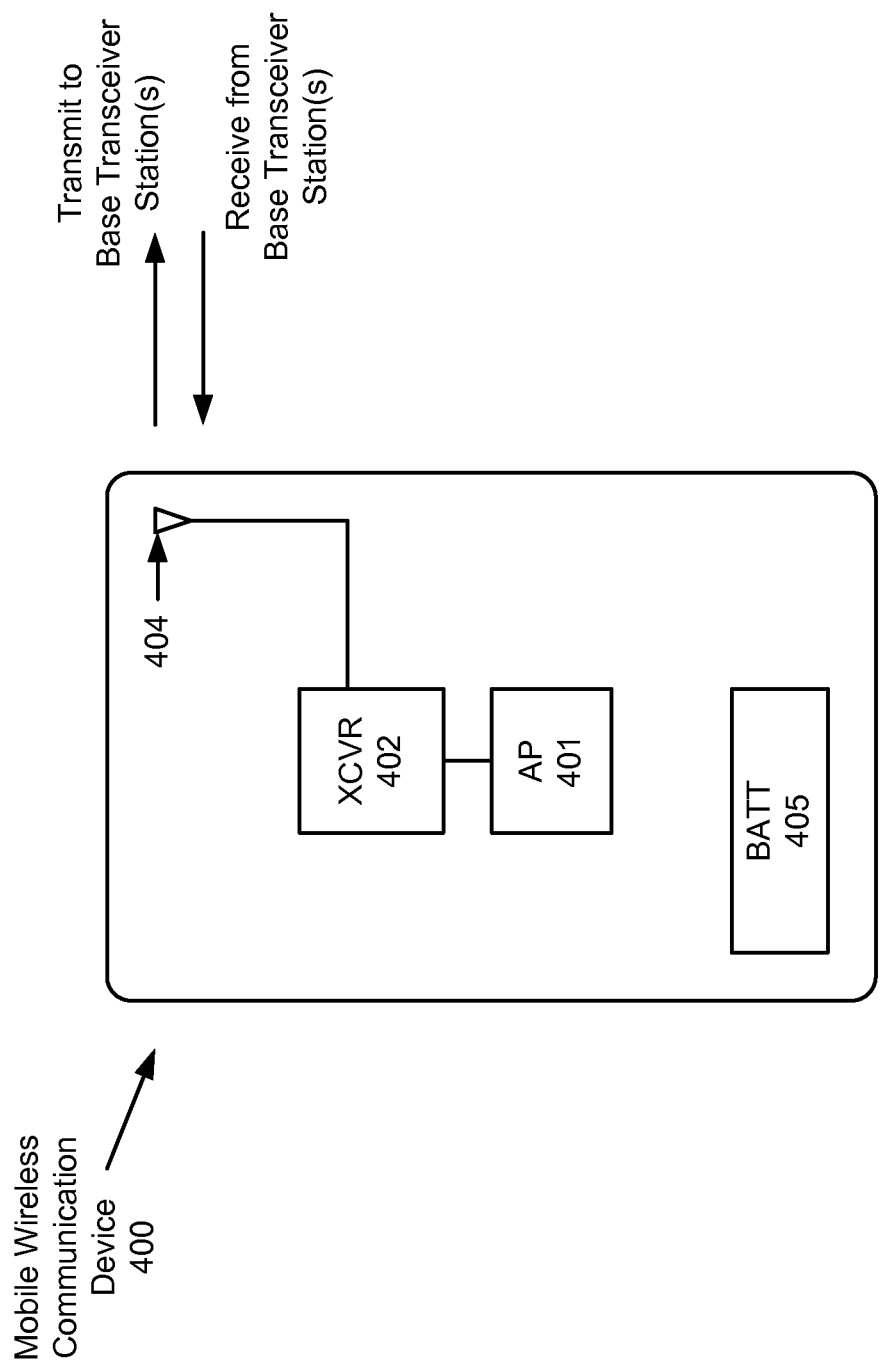
FIG. 4 shows a representative mobile wireless communication device in accordance with the described embodiments.
Figure 5:
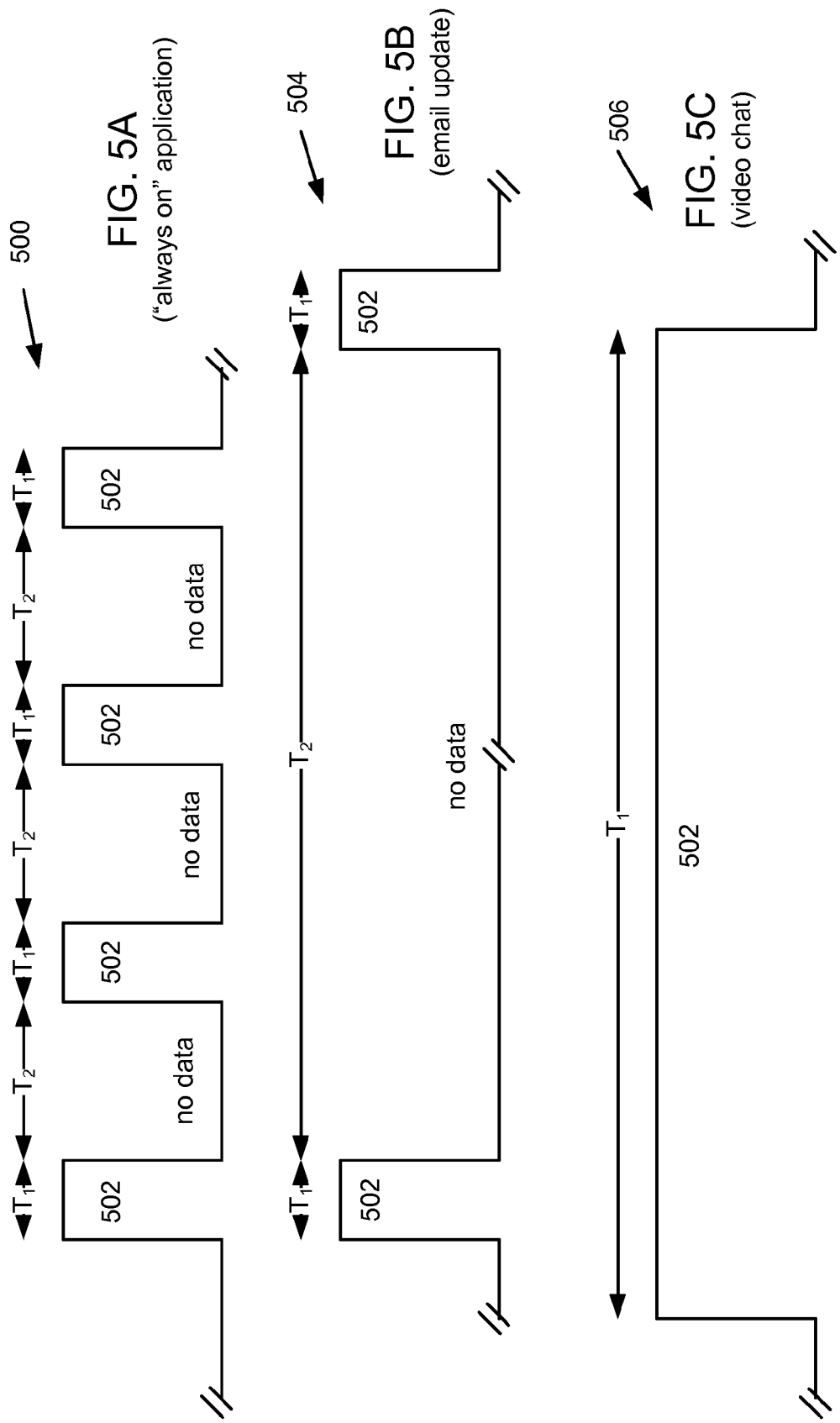
FIG. 5A, FIG. 5B and FIG. 5C show representative data traffic patterns in accordance with the described embodiments.

FIG. 4 illustrates a representative embodiment of UE 102 in the form of mobile wireless communication device 400 (referred to hereinafter as simply communication device 400) that can include at least application processor (AP) 401 and transceiver (XCVR) 402 that can transmit and receive radio frequency signals to and from base transceiver stations in wireless communication network UTRAN 104 through antenna 404. In some embodiments, multiple antennas can be included in communication device 400 to increase transmit and/or receive signal diversity. Transceiver 402 can encode and modulate digital data into analog signals for transmission on a radio frequency carrier through antenna 404. Similarly transceiver 402 can demodulate and decode analog signals received by antenna 404. Battery 405 can provide power to operate communication device 400 when not receiving power from an external power supply. Application processor 401 can formulate digital data messages that can be transmitted and received by transceiver 402. Control signals in addition to data messages can be exchanged between the communication device 400 and the wireless network.

As discussed above, the amount of power consumed (and resulting battery life) by communication device 400 can depend on its connected (or non-connected) state The power consumption (and therefore the expected battery life) of communication device 400 can be optimized by more closely aligning a current RRC connection state to a current operating state of communication device 400. More specifically, information concerning the current operating state of communication device 400 can include an indication of data uploads and downloads (referred to as a data traffic pattern) received from and sent to UTRAN 104 at communication device 400. This data traffic pattern can influence the RRC connection state of communication device 400 and thereby can affect an amount of power currently being consumed by communication device 400. For example, the CELL_DCH connection allocates a dedicated data channel used for substantial data transfer between UTRAN 104 and communication device 400. However, the allocation of the dedicated data channel can require a substantial commitment of resources of battery 405 to provide power to sustain and service the dedicated communication channel. It can be desirable to limit power consumption of communication device 400 to remain in CELL_DCH only as long as necessary to complete a particular data transaction (both a data upload and download). For example, in order to keep power consumption to a minimum, communication device 400 can be instructed to remain in CELL_DCH only when data is being actively transferred and to transition to a lower power consuming RRC connection state such as CELL_PCH or to the unconnected IDLE state after a period of data inactivity. The network can also seek to reassign radio resources from a communication device 400 that is inactive to another communication device 400 that requires an active data connection.

Although desirable for reducing power consumption of the communication device 400, releasing a data channel from the CELL_DCH state and then re-establishing a data channel from the IDLE state can use a substantial amount of network resources due to signaling traffic between UTRAN 104 and communication device 400. The current (or anticipated) data traffic pattern can have a substantial impact on the current (or anticipated) power consumption of communication device 400 as well as on the use of network resources to establish and release connections over which to transport the data traffic. A mode in which communication device 400 is being operated (e.g. browsing mode, video chat mode, and so on) can dictate the data traffic pattern required to adequately service that mode. FIGS. 5A, 5B and 5C illustrate data traffic patterns that can represent different modes of operation of communication device 400. FIG. 5A illustrates a data traffic pattern 500 consistent with communication device 400 executing an application that can cause communication device 400 to operate in an "always on" mode. In the "always on" mode, short duration data 502 can be periodically transferred between communication device 400 and UTRAN 104. Data 502 can, for example, originate at communication device 400 and can provide location information of communication device 400 to a server computer by way of UTRAN 104. Data 502 can also originate from a server computer (such as an email server as shown in FIG. 5B as data pattern 504) that can periodically push data (email updates, for example) to communication device 400. To adequately service the transfer of data 502, a dedicated data channel between communication device 400 and UTRAN 104 can be used, as in a CELL_DCH state 304. UTRAN 104 can instruct communication device 400 to transition to RRC connection CELL_DCH state 304, at least for an amount of time $T_1$ required for the transfer of data 502 between communication device 400 and UTRAN 104. To optimize power consumption, communication device 400 can transition from CELL_DCH state 304 to a low power consumption state (such as IDLE state 302 or CELL_PCH state 308) for a period of time $T_2$ subsequent to the completion of the transfer of data 502. After the period of time $T_2$ has expired, communication device 400 can transition back to CELL_DCH state 304 in order to properly service the next transfer of data 502 during the next time period $T_1$. Substantial network resources can be required to repeatedly re-establish the dedicated data channel of CELL_DCH state 304. Excessive signaling can contribute to network congestion and/or impact call quality (i.e., increased drop rate, slower response time, transfer rates, etc.). FIG. 5C shows data traffic pattern 506 representative of large amounts of data being transferred between UTRAN 104 and communication device 400. Data traffic pattern 506 can be representative of, for example, video chatting. In this case, communication device 400 can remain continuously in CELL_DCH state 304 as data is being transferred between communication device 400 and an external video chat server by way of UTRAN 104.

Figure 6:
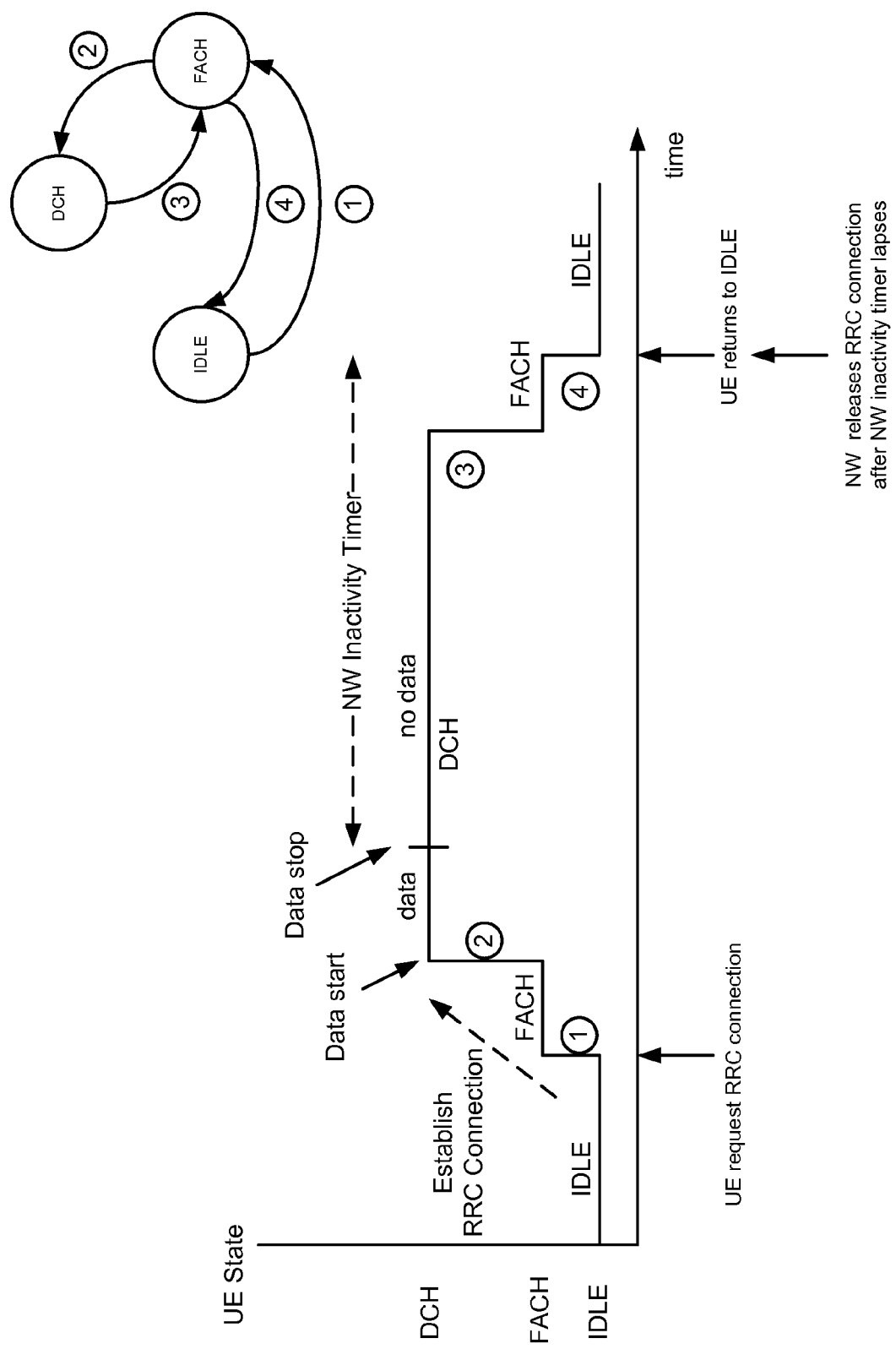
FIG. 6 and FIG. 7 show UE state change diagrams in accordance with the described embodiments.

FIG. 6 illustrates a scenario in which the network releases a connection with a UE 102 following a period of data inactivity as monitored by the network. To send or receive data 502, UE 102 can establish an RRC communication channel by submitting an RRC connection request to UTRAN 104 in the wireless network along as illustrated in FIG. 2. More specifically, UE 102 can initiate the establishment of an RRC connection by sending an RRC connection request (RRC) message. This message can contain an "Initial UE Identity" which could be for example an international mobile subscriber identifier (IMSI) or other similar identifier. An RRC connection setup (RRC) message can be sent by the network to accept the establishment of an RRC connection for a UE 102 and to assign a cell radio network temporary identifier (C-RNTI) to the UE 102 that requested the RRC connection setup. UE 102 can be addressed by the network using the "Initial UE Identity" that was sent in the RRC connection request message from the UE 102. If the establishment request is rejected, then the network can transmit an RRC connection reject. In response to receipt of the RRC connection setup message sent from UTRAN 104, an RRC connection setup complete message (RRC) can be sent by the UE 102 to the network.

During the establishment of the RRC connection, UTRAN 104 can move UE 102 from IDLE state to CELL_DCH state at which data can be transported via an uplink or downlink channel. Once the transfer of data is complete, UTRAN 104 can maintain UE 102 in CELL_DCH state until a network inactivity timer (NIT) expires. An amount of time for the NIT can be set by the network. After the NIT expires, UTRAN 104 can terminate the RRC communication channel and can move UE 102 to the IDLE state. Waiting until the expiration of the NIT before relinquishing the RRC communication channel can cause UE 102 to expend power resources, even in the absence of data transmission or reception with the network. In the absence of information from the UE 102, the UTRAN 104 cannot know when additional data can be available to be sent or received. After release of the initial RRC connection, new data transmissions can require re-establishment of a subsequent RRC connection to transfer the new data. For example, if UE 102 is executing the "always on" application that periodically sends data to an external server, depending on a value for the NIT, RRC connections can be repeatedly established used and released. This can result in an increase in network signaling that can affect adversely Quality of Service (QoS).

Figure 7:
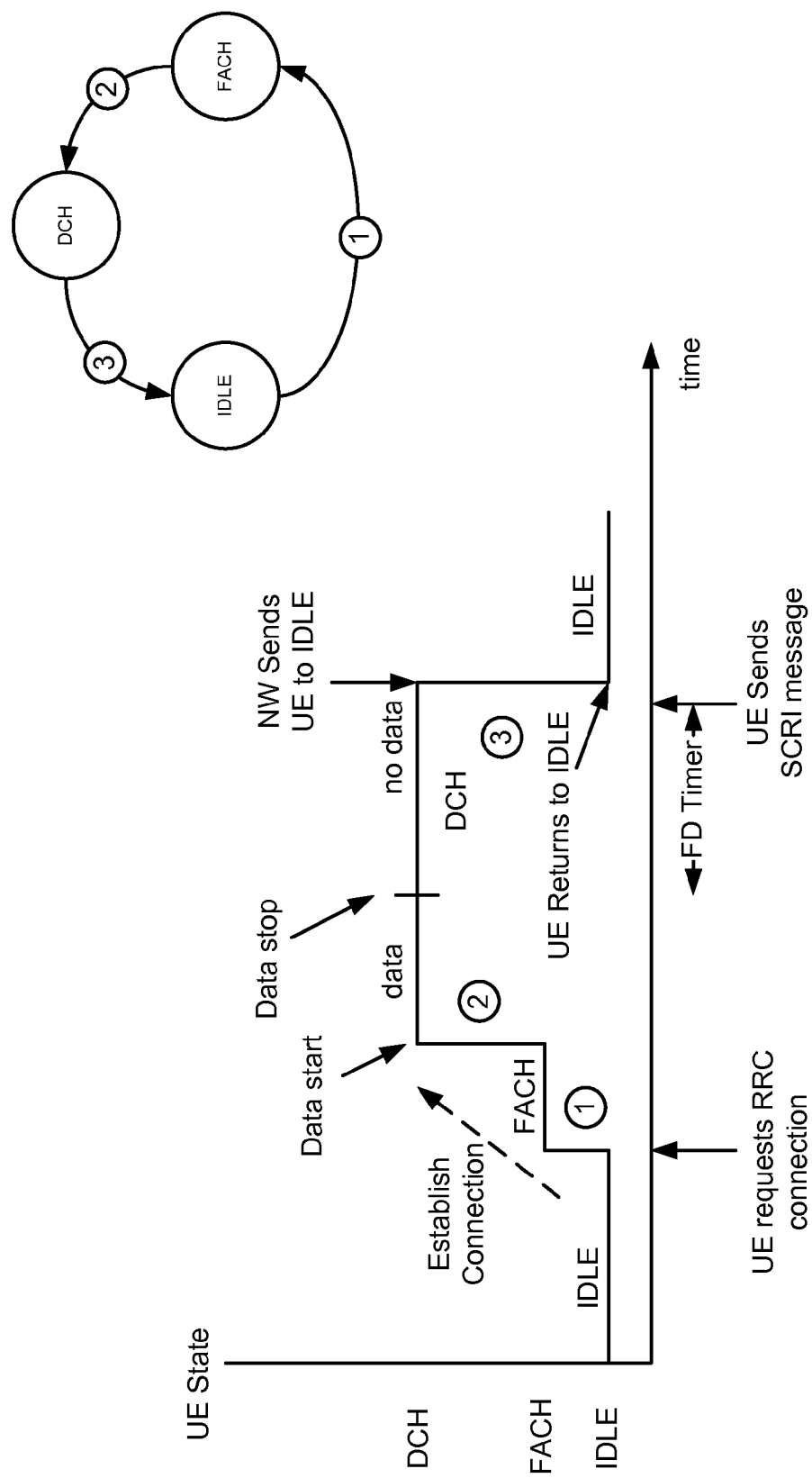

FIG. 7 illustrates a scenario whereby UE 102 can indicate a signaling connection release indication (SCRI) message to the UTRAN 104 after measuring a period of data inactivity. When a fast dormancy (FD) timer expires, the UE 102 can send an SCRI message to the UTRAN 104. The SCRI message can include a cause value in which the UE 102 can indicate a request end a packet data session. The SCRI message can provide an indication to UTRAN 104 that UE 102 has determined that it has concluded active PS data transfer. Upon reception of this SCRI message, UTRAN 104 can trigger an RRC state transition in UE 102 to a more battery efficient state, such as moving the UE 102 to the IDLE state as illustrated in FIG. 7. Alternatively UTRAN 104 can move the UE 102 to CELL_PCH or URA_PCH states (not shown). Each of the states IDLE, URA_PCH and CELL_PCH can be considered a battery efficient state, at least compared to the DCH state. Returning from the IDLE state to the DCH state to transmit or receive data can require re-establishing an RRC connection, which can use significant amounts of signaling resource. For an "always on" application, e.g. as illustrated in FIG. 5A, placing the UE 102 in a PCH state can reduce network signaling requirements by allowing the relatively frequent "keep alive" messages of the "always on" application with minimal signaling load on the network.

Measuring data activity at a mobile wireless communication device 400 (equivalently the UE 102) can occur in the application processor (AP) 401 or in the transceiver (XCVR) 402 or in a combination of both. In an embodiment, the AP 401 can measure data activity and can request release of a connection to the wireless network following expiration of a fast dormancy (FD) timer based on a period of data inactivity. The AP 401 can adjust values of the FD timer based on the measured data activity. The XCVR 402 can formulate and transmit the SCRI message to request release of the connection with the wireless network. In an embodiment, the XCVR 402 can provide an indication to the AP 401 whether the SCRI message has been sent. The XCVR 402 can ignore the request to send the SCRI message when transmitting a high priority signaling message. In this case, the XCVR 402 can indicate to the AP 401 when the requested SCRI message is not transmitted. As a result, the AP 401 can re-request transmission of the SCRI message by the XCVR 402 to the wireless network.

The FD timer can be set to a value and can count down during periods of data inactivity. The FD timer value can be reset after a period of data activity. After expiration of the FD timer, the UE 102 can send an SCRI message to the network requesting release of the RRC connection. Ideally, an FD timer value can balance between reduction in signaling for the network and reduction in power consumption for the UE. Sending SCRI messages after a short time interval (lower FD timer value) can result in additional signaling between the UE 102 and the network, particularly when the UE 102 is sent to the most power efficient IDLE state following the SCRI message. Re-establishing connections often can add to signaling load on the network. Sending the SCRI message after a longer time interval (higher FD timer value) can reduce network signaling but can increase power consumption (and therefore battery drain) at the UE 102. Thus, a single fixed value for the FD timer can be inefficient and not well matched to different applications and services that can send and receive data at different time intervals as illustrated by the several examples shown in FIGS. 5A, 5B and 5C. Instead a variable FD timer value that can adapt dynamically to changing data transmission and reception conditions of different applications can more appropriately match the current and/or future use by applications and services of the UE 102.

FIG. 8A illustrates a scenario in which data is communicated between the UE 102 and the UTRAN 104 in a wireless network at a regular interval. As described above, applications that can be considered "always on" can send "keep alive" messages at regular intervals to indicate an application's readiness to a server across the network. When a fast dormancy (FD) timer value is less than the time interval of data inactivity between successive data transmissions, the UE 102 can send an SCRI message after each data transmission. In response to the SCRI message, the wireless network can release the RRC connection and put the UE 102 in an IDLE state. Although not shown in FIG. 8A, the network can also put the UE into the PCH state or the URA-PCH state. To simplify the diagram, only the IDLE state is shown, but it should be understood that other power efficient states can also be used. Subsequently when data transmission resumes, a new RRC connection can be established to transport the new data. Establishing the new RRC connection can require significant signaling resources between the UE 102 and the wireless network. Again after an FD time interval determined by the FD timer, another SCRI message can be sent to release the RRC connection. This process of establishing an RRC connection, sending data, waiting a "fast dormancy" time interval for data inactivity, sending an SCRI message and releasing the RRC connection can repeat for every data transmission as shown in FIG. 8A. A fixed value for the FD timer can be ill matched to the frequency of data transmissions. A typical value for a fixed FD timer can be 2.5 seconds, which can be on the order of frequency for certain applications such as internet messaging (IM) traffic. Establishing an RRC connection can require approximately 2 to 3 seconds for completion. A user of an IM application could find the connection "slow to respond", because while reading a previously received message and not sending or receiving (i.e. during a period of data inactivity), the UE 102 and the network can release the RRC connection, which can then need to be re-established to send a subsequent message. Similarly, internet browsing sessions or other applications that update data at an interval longer than the FD timer value can result in "sluggish" behavior and mar the user experience.

FIG. 8B illustrates a scenario of regular data transmission that includes an additional timer T323 described in Release 8 of the Third Generation Partnership Project (3GPP) UMTS wireless networking standard. As with the FD timer value, a value for the T323 timer can be set by the network and communicated to the UE 102. A typical value for the T323 timer can be 60 seconds, i.e. significantly longer than the typical fixed value for the FD timer of 2.5 seconds. After sending an SCRI message, the UE 102 can be restricted from sending a subsequent SCRI message until after the expiration of the T323 timer, as shown in FIG. 8B. The UE 102 can remain in a DCH state or FACH state (if directed by the network) longer in FIG. 8B than without the T323 timer as shown in FIG. 8A, and this can result in increased consumption of battery power in the UE 102. As a result of the T323 timer, the UE 102 can be unable to request to enter the IDLE state. Rather than use a fixed value for the FD timer as in FIG. 8A, which can result in excessive signaling for the network, or a fixed value for the FD timer with a T323 timer as in FIG. 8B, which can result in excessive UE 102 battery power drain, an adaptive FD timer value can be used to better match the FD timer to data activity at the UE 102. Adapting the FD timer value can result in improvements to reduce excessive network signaling during periods of relatively frequent data activity (transmission and/or reception) and increase battery savings during periods of relatively infrequent data activity.

Figure 9:
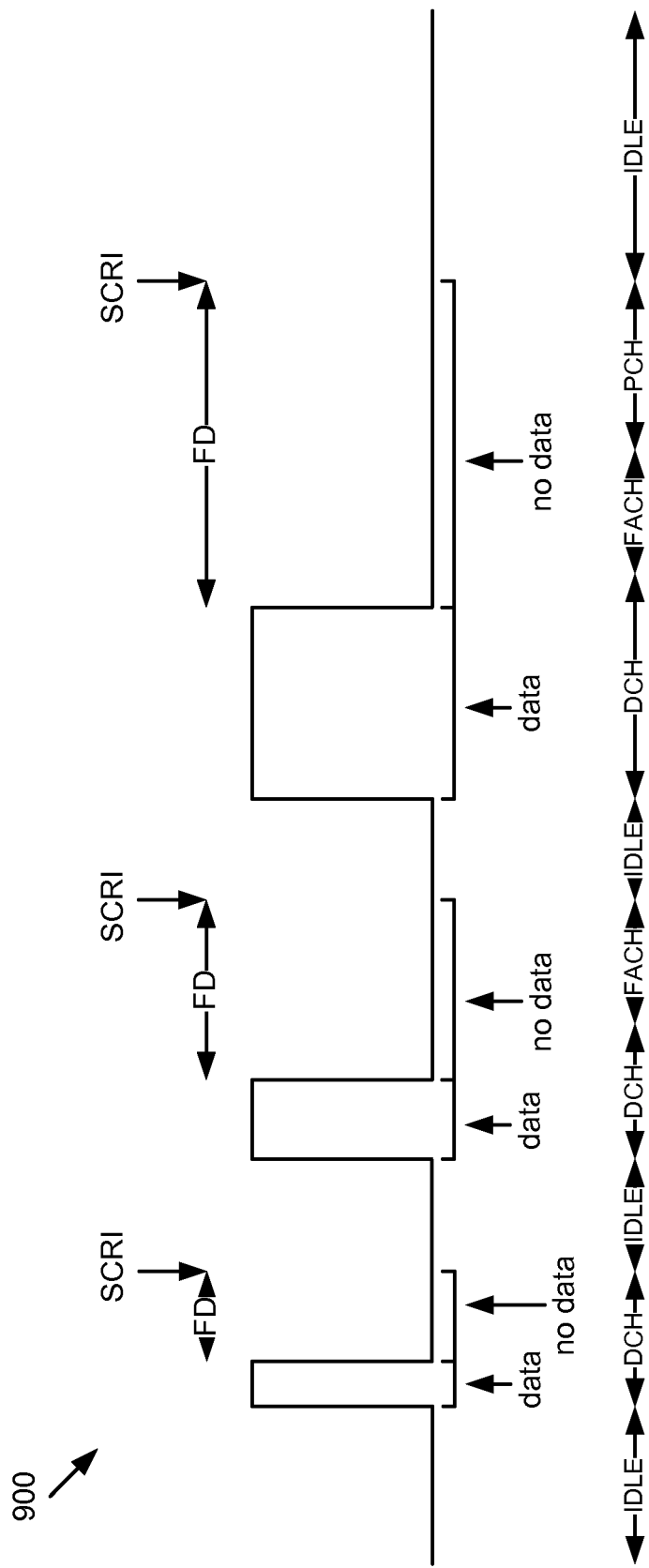
FIG. 9 illustrates variation in fast dormancy timer values based on data activity patterns at a UE in accordance with the described embodiments.

FIG. 9 presents a general scenario 900 in which values used for the FD timer can adapt to a history of data activity at the UE 102. The history of data activity can include a number of measures of data transmission and/or reception such as a time span of data activity, a frequency of data activity, an amount of data activity or other measures. Typically, a time span of data activity measured over a recent time period can be used to assess data activity. The FD timer can be adapted upward or downward from a present value based on the measured data activity. Initially, the FD timer can be set to an initial fixed value. In one embodiment, a value of 2.5 seconds can be used for the initial value of the FD timer. If there is no data activity for a period of 2.5 seconds, then the FD timer at the UE 102 can expire and the UE 102 can send an SCRI message to the network requesting release of an existing data connection. The network can then place the UE 102 in the IDLE state (or another power efficient state such as the PCH state or the URA-PCH state) in response to the SCRI message. Following a longer data activity period, e.g. longer than 2.5 seconds of the FD timer value, the FD timer value can be increased. The UE 102 can send an SCRI message after the expiration of the longer FD timer. If data activity occurred sooner than the expiration of the longer FD timer, the FD timer can be reset and no SCRI would be sent. While the UE 102 is awaiting the expiration of the longer FD timer, the network can choose to move the UE 102 to an alternative state, such as the FACH state as shown. Thus the UE 102 can be in the highest power consuming DCH state for a shorter period of time, but can avoid entering the IDLE state early where re-establishment of the RRC connection can require significant signaling between the UE 102 and the network. Relatively longer data activity periods can result in relatively higher values for the FD timer. Relatively shorter data activity periods can result in relatively shorter values for the FD timer.

Figure 10:
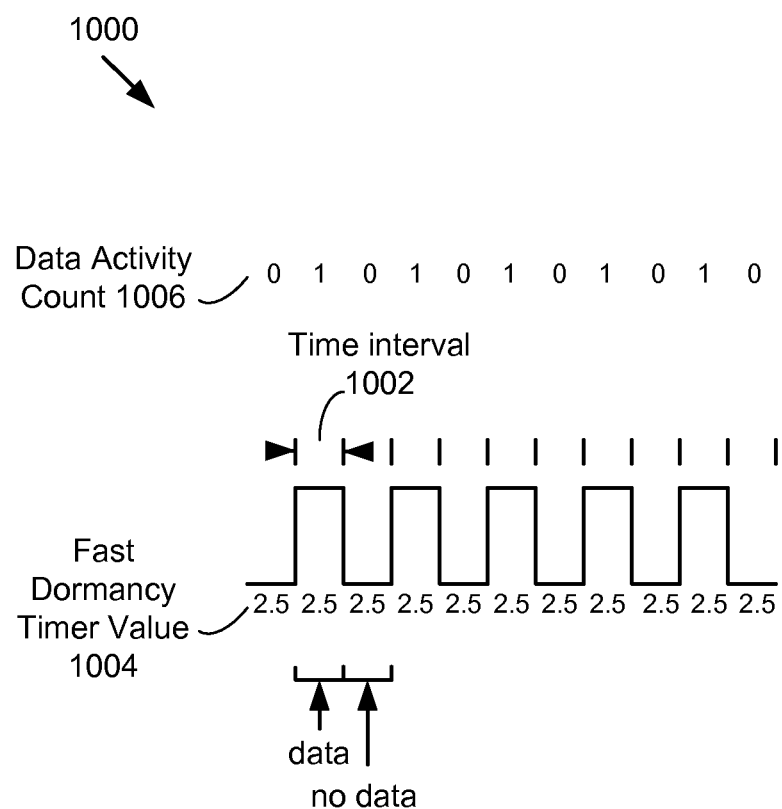
FIG. 10, FIG. 11 and FIG. 12 illustrate relationships between data activity and a fast dormancy timer at a UE in accordance with the described embodiments.

FIG. 10 illustrates a data activity pattern 1000 in which alternating time intervals 1002 include a period of data activity followed by a period of data inactivity. A data activity count 1006 can be maintained by the UE 102 that counts the number of successive time intervals 1002 that include data activity. As shown in FIG. 10, the data activity count 1006 can be set to zero during each time interval 1002 in which no data activity occurs. For a first time interval 1002 that includes data activity following one or more time intervals of data inactivity, the data activity count 1006 can be set to one. The data activity pattern 1000 shown in FIG. 10 results in an alternating data activity count 1006 of zeroes and ones, as no two successive time intervals include data activity. A fast dormancy (FD) timer value 1004 can be based on the history of data activity. Initially the fast dormancy timer value 1004 can be set to an initial pre-determined value, such as 2.5 seconds as indicated in FIG. 10. A single time interval 1002 of data activity can result in a change in the data activity count 1006, but the fast dormancy timer value 1004 can remain unchanged, as the data activity pattern can have not indicated that a longer fast dormancy timer value 1004 can be warranted. A period of data inactivity following the period of data activity can result in a reset of the data activity count 1006 to zero. As a result, an alternating pattern of data activity followed by data inactivity in successive time intervals 1002 can result in an unchanged value for the fast dormancy timer 1004. Longer periods of successive time intervals with data activity, however, can result in a change in the fast dormancy timer value 1004 as shown next in FIG. 11.

Figure 11:
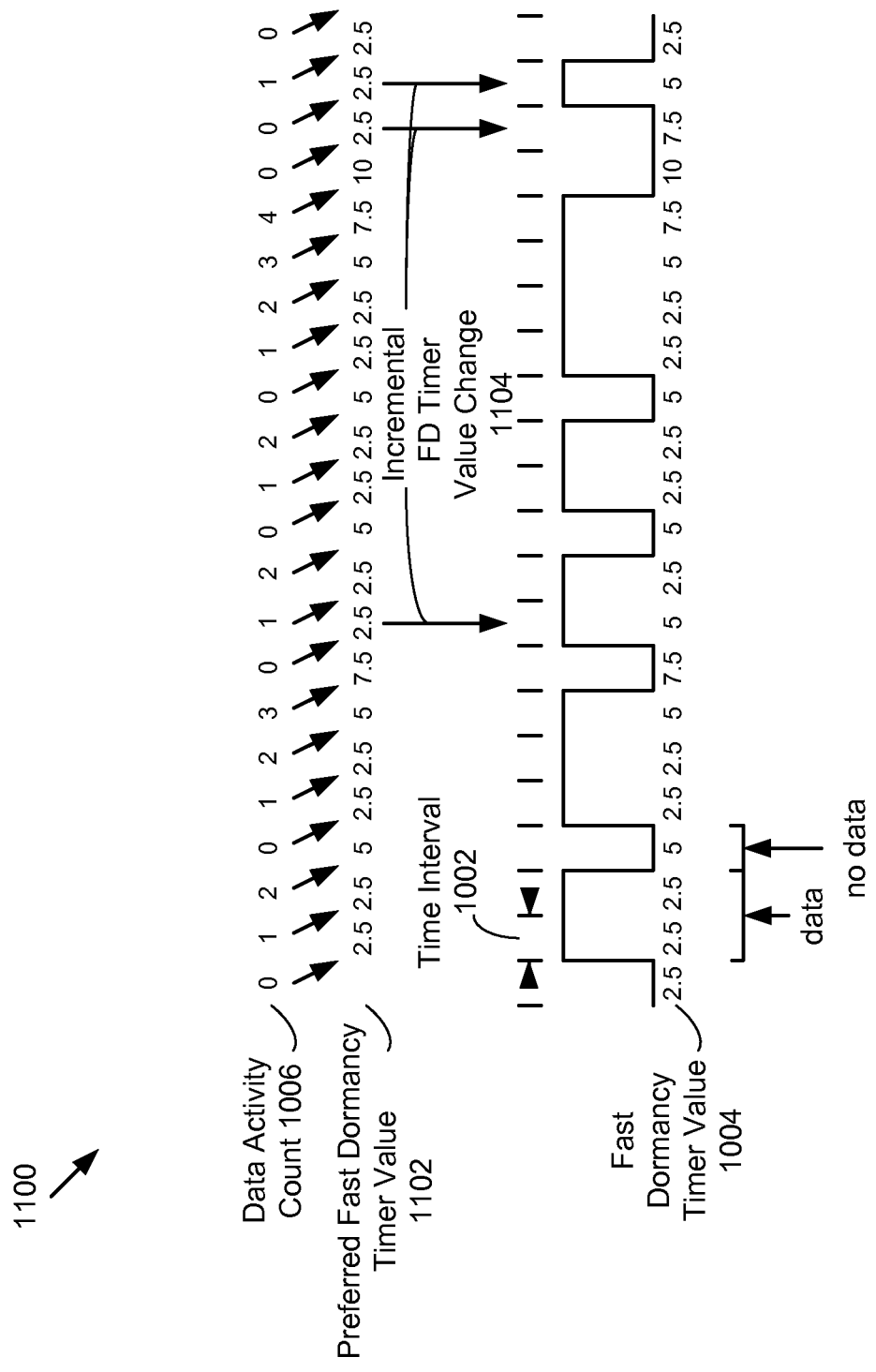

FIG. 11 illustrates a second pattern of data activity 1100 that can result in changing values for the data activity count 1006 and changing values for the fast dormancy timer 1004. Longer periods of successive time intervals 1002 with data activity can result in increased values for the fast dormancy timer value 1004. The data activity count 1006 can increase for each successive time interval 1002 during which data activity occurs and can be reset to zero for each time interval 1002 in which no data activity occurs. The fast dormancy timer value 1004 indicated in FIG. 11 for a given time interval 1002 can have been determined by the history of data activity up to the previous time interval 1002, i.e. data activity in a current time interval 1002 can affect the fast dormancy timer value 1004 in future time intervals 1002. The data activity count 1006 indicates a cumulative number of successive time intervals during which data activity can have occurred. As shown in FIG. 11, two successive time intervals that include data activity can result in a data activity count 1006 increasing from 0 (before data activity occurred) to 1 (for the first time interval with data activity) to 2 (for the second successive time interval with data activity). Similarly "n" successive time intervals of data activity can result in the data activity count 1006 increasing to a value of "n". The fast dormancy timer value can be increased based on the increased data activity count 1006. The data activity count 1006 can represent a measure by which a history of data activity can be tracked. A data activity count of "2" in a time interval 1002 can result in an increase in the fast dormancy timer value 1004 from the default value of 2.5 seconds in the current time interval 1002 to an increased value of 5.0 seconds in the subsequent time interval 1002. Similarly "n" successive time intervals 1002 that include data activity can result in an increase of the fast dormancy timer value 1004 to n·2.5 seconds in the subsequent time interval 1002 (where the bullet operator symbol "·" can indicate multiplication). As shown in FIG. 11, following time intervals of data activity, the fast dormancy timer value 1004 can increase, while following time intervals of data inactivity the fast dormancy timer value 1004 can decrease.

The data activity count 1006 can provide an indication of a preferred fast dormancy timer value 1102. The actual fast dormancy timer value 1004 can be increased or decreased to approach or equal the preferred fast dormancy timer value 1102 as indicated by the data activity count 1006. For example, a data activity count of "n" can indicate a preferred fast dormancy timer value 1004 of n·2.5 seconds. The actual fast dormancy timer value 1004 can be increased (or decreased) to approach the corresponding preferred fast dormancy timer value 1102. As shown in FIG. 11, the actual fast dormancy timer value 1004 can increase to the preferred fast dormancy timer value 1102 after each successive time interval with data activity. Following a data activity count 1006 of zero, the preferred fast dormancy timer value 1102 can be 2.5 seconds, while the actual fast dormancy time value 1004 can decrease incrementally as indicated by the incremental FD timer value change 1104 highlighted in FIG. 11. The incremental FD timer value change 1104 can decrease the actual fast dormancy timer value 1004 more slowly that immediately changing the actual fast dormancy timer value 1004 to the preferred fast dormancy timer value 1102 following a time interval 1002 with no data activity. As shown in FIG. 11, the actual fast dormancy timer value 1004 can be higher following periods of data activity, e.g. 5 or 7.5 or 10 seconds rather than 2.5 seconds. The actual fast dormancy timer value 1004 can decrease incrementally during periods of data inactivity, e.g. 10 to 7.5 to 5 to 2.5 seconds.

As also shown in FIG. 11, following a period of sustained data activity, the actual fast dormancy timer value 1004 can be high, e.g. 10 seconds. With data inactivity, the fast dormancy timer value 1004 can decrease, e.g. to 7.5 seconds and then to 5.0 seconds. A single period of data activity can still result in the actual fast dormancy timer value 1004 continuing to decrease, as a single period of data activity can correspond to a preferred fast dormancy timer value 1102 of 2.5 seconds, which can be less than the current fast dormancy timer value 1004 of 5 seconds during the period of data activity. Thus isolated data activity in a given time interval, in certain situations, can result in no increase in the fast dormancy timer value 1004. Sustained data activity (or data inactivity) can contribute most strongly to affecting the fast dormancy timer value 1004.

Figure 12:
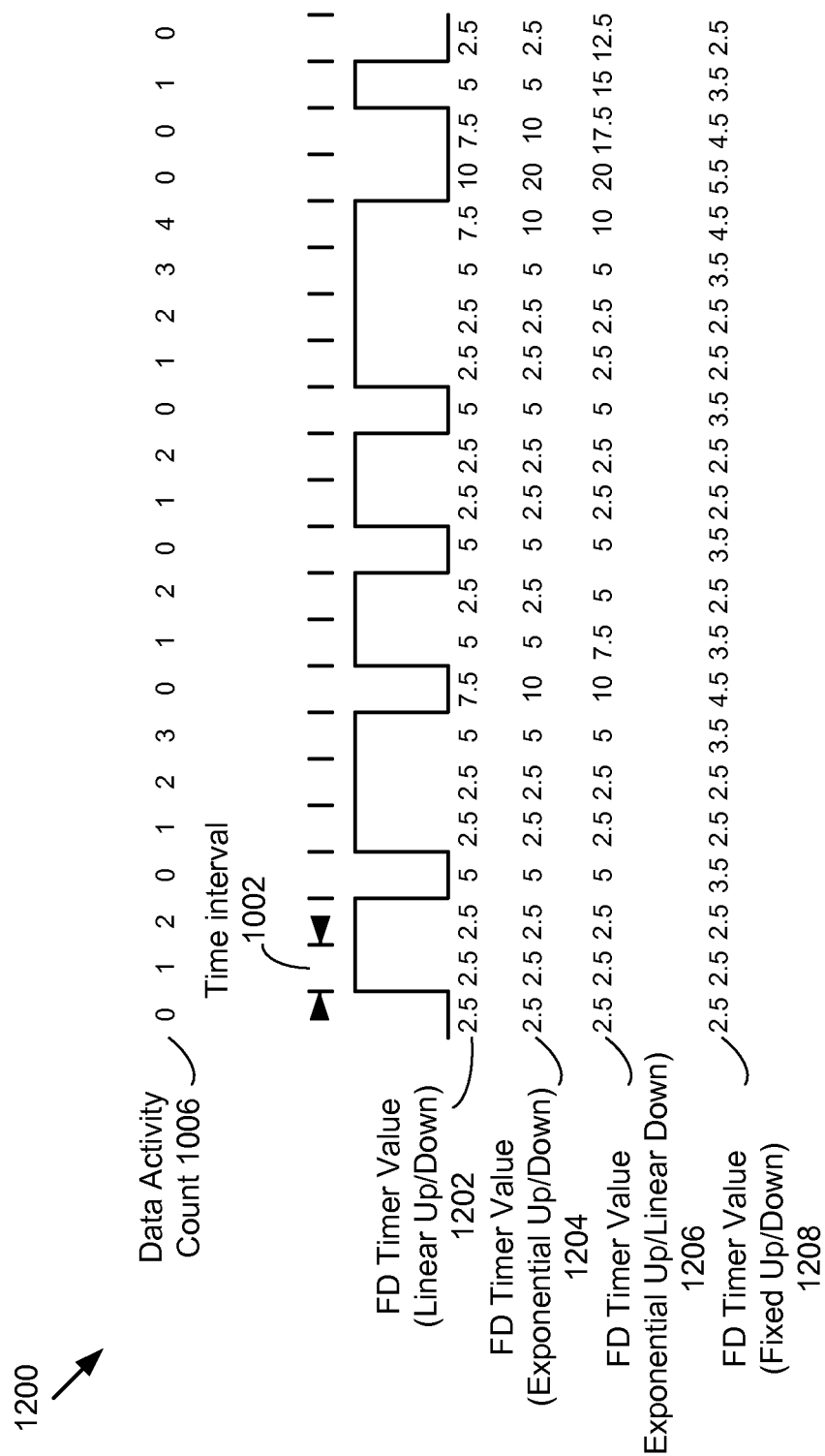

FIG. 12 illustrates different incremental patterns 1200 for how the actual fast dormancy (FD) timer values can be changed. In one embodiment, the FD timer value can change linearly 1202 upward and downward based on the data activity count 1006. In another embodiment, the actual FD timer values can be changed exponentially 1204, providing a more rapid increase and decrease in the FD timer value. In a further embodiment, the actual FD timer values can be increased exponentially and decrease linearly 1206 resulting in a rapid increase and slower decrease in FD timer values. In yet another embodiment, the actual FD timer values can be increased or decreased by a constant fixed amount 1208.

FIG. 13 provides a table 1300 that summarizes a correspondence between the data activity count 1006 and different preferred FD timer values. A linear preferred FD timer value 1302 of "n(default)", i.e. n times a default value, can correspond to a data activity count 1006 of "n" successive time intervals with data activity. An exponential preferred FD timer value 1304 of (default)$^n$ can also correspond to the data activity count 1006 of "n", resulting in faster adaptation of the values of the FD timer. In another embodiment, the preferred FD timer value 1306 can change by a constant fixed incremental value, i.e. the data activity count 1006 of "n" can correspond to a preferred FD timer value 1306 equal to the default value plus (n−1) times can a constant increment. The preferred FD timer value can be also bounded to be less than or equal to a maximum value or greater than or equal to a minimum value. Typically the default value for the preferred FD timer value can be the minimum value, while the maximum value can be set based on characteristics of the wireless network. The minimum and maximum values for the FD timer can be pre-determined or can be set based on communication between the wireless network and the UE 102.

Figure 14:
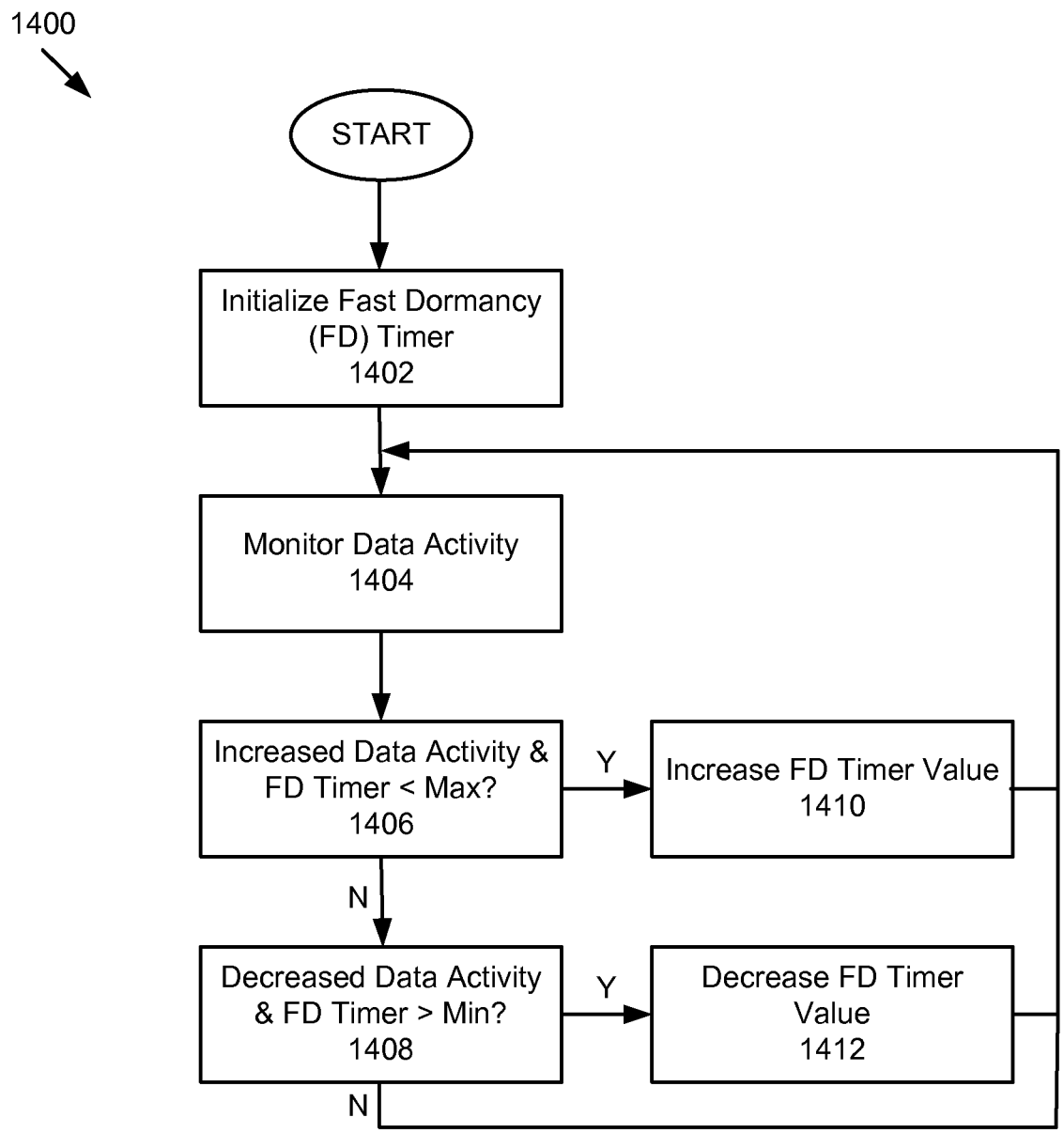
FIG. 14 illustrates an embodiment of a method to adapt a fast dormancy timer based on data activity at a UE.

FIG. 14 illustrates one embodiment of a method 1400 to adapt a fast dormancy (FD) timer based on a history of data activity monitored at a mobile wireless device. In step 1402, an initial value for the fast dormancy timer can be set. The initial value can be pre-determined, e.g. set to a default value indicated by a telecommunications standard under which communication between the UE 102 and the wireless network operate, or can be dynamic, e.g. communicated by the wireless network to the UE 102 dependent on network operating conditions. For each successive time interval (the length of which can also be pre-determined or dynamic), the UE 102 can monitor for data activity in step 1404. Data activity can include transmission of data from the UE 102 to the wireless network and/or reception of data by the UE 102 from the wireless network. Data activity can be monitored over a series of successive frames, i.e. a history of data activity can be used by the method 1400. In step 1406, the measured data activity (over the most recent time interval or over a "history" of time intervals) can be compared against a threshold or against previous measurements. The UE 102 can determine if data activity has increased and whether the current actual fast dormancy timer does not exceed a maximum threshold. When the data activity increases and the fast dormancy timer is below the maximum threshold, the fast dormancy timer can be increased in step 1410. Otherwise, in step 1408, the UE 102 can determine if data activity has decreased and whether the current fast dormancy timer exceeds a minimum threshold. When the data activity decreases and the fast dormancy timer is above the minimum threshold, the fast dormancy timer can be decreased in step 1412. The sequence of steps can then be repeated for additional time intervals, adapting the fast dormancy upward and downward based on the history of data activity measured by the UE 102.

Figure 15:
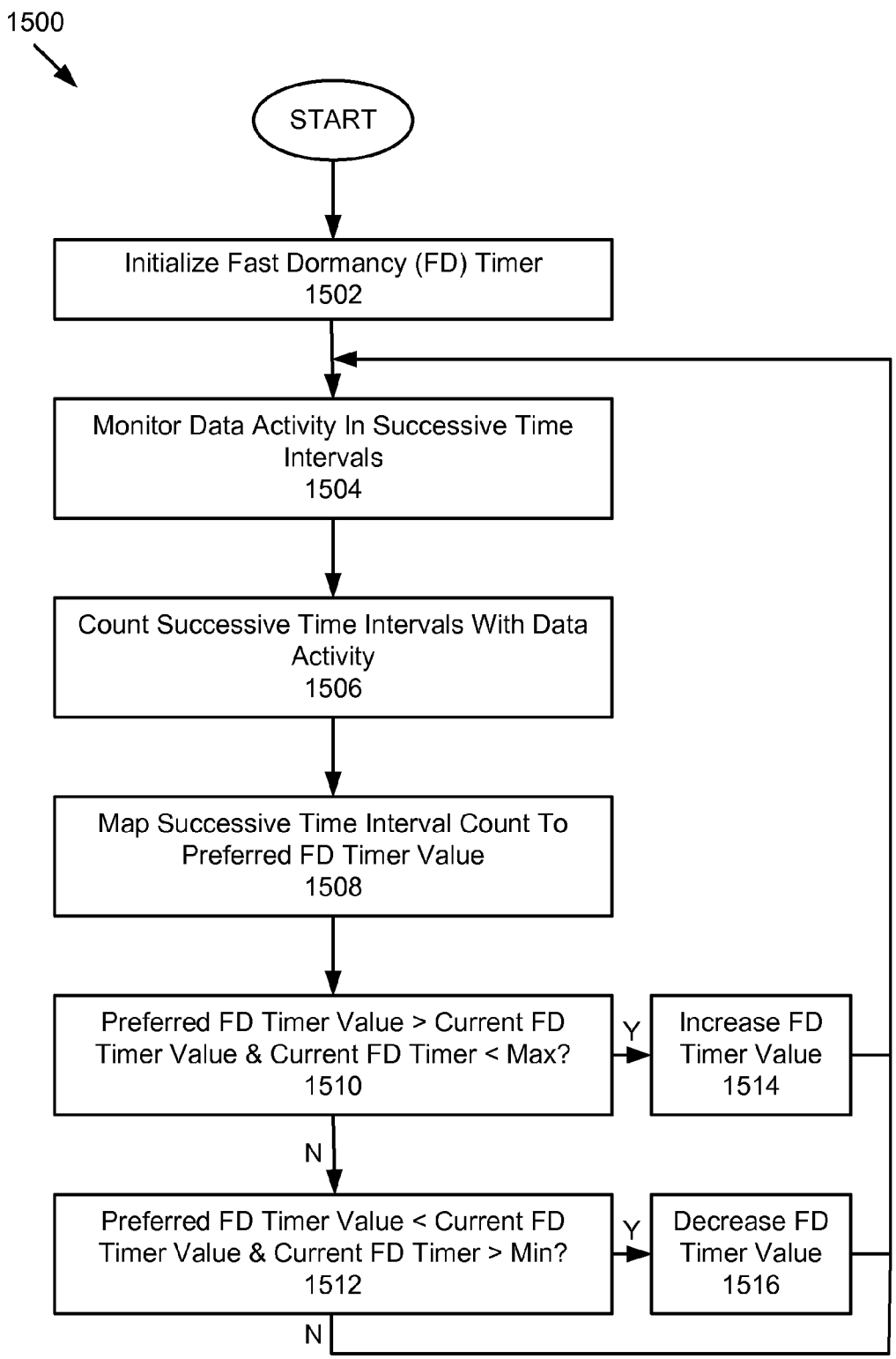
FIG. 15 illustrates another embodiment of a method to adapt a fast dormancy timer based on data activity at a UE.

FIG. 15 illustrates another embodiment of a method 1500 to adapt the fast dormancy (FD) timer based on a history of data activity measured at the mobile wireless device. In step 1502, the fast dormancy timer can be initialized to a default value. In step 1504, data activity between the UE 102 and the wireless network can be monitored by the UE 102 during a time interval (or a succession of time intervals). In step 1504, the UE 102 can count a number of successive time intervals in which data activity occurred. In step 1508, the number of successive time intervals that include data activity can be mapped to a preferred fast dormancy timer value. The preferred fast dormancy timer value can be lower, equal or higher than the actual fast dormancy timer value in use. In steps 1510 and 1512, the preferred fast dormancy timer value can be compared to the current fast dormancy timer. If the preferred fast dormancy timer value is greater than the current fast dormancy timer value and the current fast dormancy timer is less than a maximum value, then in step 1514, the UE 102 can increase the fast dormancy timer value. Otherwise, if in step 1512, the preferred fast dormancy timer value is less than the current fast dormancy timer value and the current fast dormancy timer value is greater than a minimum value, in step 1516, the UE 102 can decrease the fast dormancy timer value. When the preferred FD timer value equals the current FD timer value, the FD timer value can remain unchanged (not shown).

Figure 16:
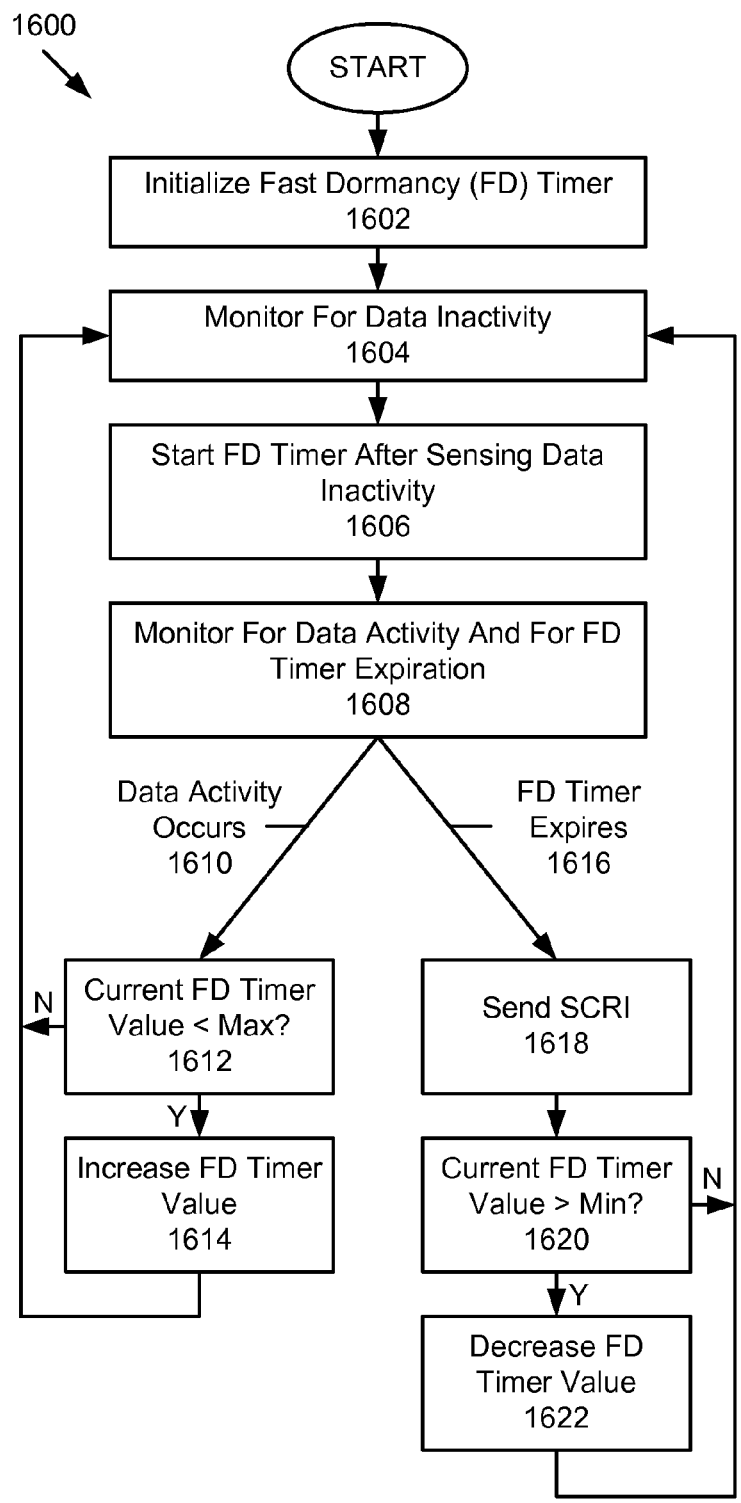
FIG. 16 illustrates a further embodiment of a method to adapt a fast dormancy timer based on data activity and inactivity at a UE.

The methods outlined in FIG. 14 and FIG. 15 adapt the FD timer based on a history of data activity measured by the UE 102 during successive time intervals. FIG. 16 illustrates an alternative method 1600 in which the UE 102 monitors for data inactivity and adapts the FD timer based on measurements following a period of data inactivity. In step 1602, the UE 102 initializes an FD timer to an initial value. In a representative embodiment, the initial FD timer value can be set to 2.5 seconds. In step 1604, the UE 102 monitors for data inactivity. Representative events at the UE 102 that can indicate data inactivity can include one or more buffers being empty for a period of time. The buffers can include storage for data prior to transmission or after reception. Typically data inactivity can occur when no data is transmitted or received for a pre-determined period of time. In step 1606, after sensing data inactivity, the UE 102 can start an FD timer. While the FD timer is running, the UE 102 can monitor for data activity and for the expiration of the FD timer as indicated in step 1608. Either data activity can occur before the FD timer expires, as indicated by the leftmost branch 1610, or the FD timer can expire, as indicated by the rightmost branch 1616.

For the leftmost branch 1610, data activity occurs prior to the expiration of the FD timer and in step 1612, the UE 102 can compare the current FD timer value used when resetting the FD timer against a pre-determined maximum FD timer value. If the current FD timer value not less than the maximum FD timer value, then the FD timer value can be unchanged, and the UE 102 can return to monitoring for data inactivity in step 1604. If the current FD timer value is less than the pre-determined maximum FD timer value, then the FD timer value can be increased in step 1614. Subsequently the UE 102, can return to monitoring for data inactivity in step 1604. Following the increase in the FD timer value, the FD timer can take longer to expire once started following another period of data inactivity.

For the rightmost branch 1616, after the FD timer expires, the UE 102 can send an SCRI message in step 1618 to the wireless network to indicate a request to release an existing RRC connection. In step 1620, the UE 102 can compare the current FD timer value used when resetting the FD timer to a pre-determined minimum FD timer value. If the current FD timer value exceeds the minimum, then in step 1622 the FD timer value can be decreased. Subsequently the UE 102, can return to monitoring for data inactivity in step 1604. Following the decrease in the FD timer value, the FD timer can expire sooner once started following a new period of data inactivity. If the current FD timer value does not exceed the minimum, then the FD timer value can remain unchanged, and the UE 102 can return to step 1604 to monitor for data inactivity. In a representative embodiment, the application processor (AP) 401 in the mobile wireless communication device 400 (equivalently the UE 102) can monitor for data inactivity and maintain and update the FD timer. The AP 401 can request that an SCRI message be sent by a transceiver (XCVR) 402 in the mobile wireless communication device 400 to the wireless network. Thus step 1618 can be considered "optional" in that the FD timer value can be updated in the AP 401 separate from the transmission of the SCRI by the XCVR 402 indicated by step 1618.

The rate at which the FD timer value can increase in step 1614 and decrease in step 1622 can be based on similar or dissimilar algorithms. For example, in one embodiment, the FD timer value can increase linearly and can decrease exponentially. In another embodiment, the FD timer value can increase by fixed increments and can decrease by fixed increments. Any combination of algorithms can be used that can effect a rate of adaption of the FD timer value for the UE 102 connected to the wireless network. In an embodiment, the algorithm used to adapt the FD timer value at any particular time can change, for example based on the applications that generate or receive data for the connection with which the FD timer can be associated. One algorithm can be used for applications with long sustained bursts of data, and a different algorithm can be used for applications with short bursts of data separated by intervals of data inactivity. The algorithm used to adapt the FD timer value can also change based on the current FD timer value. For example, the FD timer value can change more rapidly near the minimum and maximum FD timer values and more slowly for intermediate FD timer values.

As described above, the UE 102 can adapt the FD timer based on transmitted or received data activity at the UE 102. In general, in some embodiments, the FD timer can be increased based on periods of longer data activity and decreased based on periods of shorter data activity. In some embodiments, the FD timer can also be increased based on periods of shorter data activity that can occur close together relative to the current FD timer value. Thus, short bursts of data activity separated by short time intervals of data inactivity without expiration of the FD timer can cause the FD timer to increase. In addition, the FD timer can be adapted based on measuring periods of data inactivity. Following periods of data inactivity in which the FD timer expires, the FD timer can be reduced to shorten the time period for the FD timer to expire subsequently.

FIG. 17 illustrates two representative scenarios 1700 and 1710 in which the FD timer can be adapted based on periods of data activity and data inactivity. In both scenarios, burst of data activity of varying lengths are interspersed with periods of data inactivity, also of variable length. The same periods of data activity are shown for both scenarios 1700 and 1710. Each marked time interval on the horizontal axes of 1700 and 1710 can represent one unit time interval (e.g. one second). The first scenario 1700 illustrates increasing the FD timer value based on measuring periods of data activity, increasing the FD timer after periods of longer data activity and decreasing the FD timer after periods of shorter data activity.

In the first scenario 1700, an FD timer can be initialized to an FD timer value 1702 of 3.0 seconds. A data activity period of 2.0 seconds can be followed by a data activity period of 4.0 seconds. As the FD timer value 1702 can be 3.0 seconds at the start of the data inactivity period, the FD timer can expire during the data inactivity period of 4.0 seconds, and the UE 102 can send an SCRI message to the wireless network. After a subsequent data activity period of 7.0 seconds the FD timer value can be increased as shown to 5.0 seconds. The value to which the FD timer can be increased can vary based on different algorithms used by the UE 102 to increase the FD timer. In one embodiment, the FD timer value can be increased (up to a pre-determined maximum) based on the length of time of the preceding data activity period. As a result of an increased FD timer value 1702, a subsequent data inactivity period of 4.0 seconds that follows the data activity period of 7.0 seconds can result in the FD timer not expiring. Subsequently, the UE 102 can measure short periods of data activity of 2.0 seconds each as shown (in contrast to the longer data activity period of 7.0 seconds measured earlier). Following each short interval data activity period, the UE 102 can decrease the FD timer value. In one embodiment, the FD timer value can decrease by 0.5 seconds following each data activity period from 5.0 to 4.5 to 4.0 to 3.5 seconds as shown. Eventually a period of data inactivity of sufficient length can exceed the current FD timer value 102 and can result in expiration of the FD timer. In particular, as shown after the FD timer value decreases to 3.5 seconds, a subsequent data inactivity period of 7.0 seconds can result in an FD timer expiration and transmission of an SCRI message to the wireless network by the UE 102. Following another short 2.0 second period of data activity, the UE 102 can decrease the FD timer value to 3.0 seconds, and another SCRI message can be sent when a subsequent data inactivity period exceeds 3.0 seconds as shown. The FD timer value can increase and decrease at different rates, for example, increasing more rapidly to accommodate longer data bursts and decreasing more slowly to minimize sensitivity to rapid short data bursts.

In the second scenario 1710, the FD timer can be adapted by the UE 102 while monitoring periods of data inactivity. When data activity occurs before expiration of the FD timer, during a period of data inactivity, the UE 102 can increase the FD timer value 1702. As shown, the FD time value 1702 can increase from 3.0 to 4.0 to 5.0 seconds following short periods of data inactivity. A longer period of data inactivity can result in expiration of the FD timer and an SCRI message being sent by the UE 102 to the network. The FD timer value 1702 can also be decreased when the FD timer expires. The FD timer value 1702 is decreased from 5.0 seconds to 3.0 seconds resulting in a quicker expiration of the FD timer. Decreasing the FD timer can be more rapid increasing the FD timer as shown. FIG. 17 illustrates that different algorithms can be used to increase and decrease the FD timer based on measuring data activity and/or data inactivity. The different algorithms can result in transmission of SCRI messages from the UE 102 to the wireless network at different times for identical data activity and data inactivity patterns.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of adapting a value of a fast dormancy timer in a wireless device in communication with a wireless network, the method comprising:
   in a wireless device:
   monitoring data activity at the wireless device;
   increasing the value of the fast dormancy timer when data activity increases and a current value of the fast dormancy timer is below a maximum threshold; and
   decreasing the value of the fast dormancy timer when data activity decreases and the current value of the fast dormancy timer is above a minimum threshold;
   wherein the fast dormancy timer controls when the wireless device requests to release a connection with the wireless network following a period of data inactivity.

2. The method as recited in claim 1, wherein monitoring data activity at the wireless device occurs in discrete time intervals, and further comprising:
   determining a successive time interval count by the wireless device by counting a number of successive time intervals that include data activity;
   mapping the successive time interval count to a preferred fast dormancy timer value; and
   changing the value of the fast dormancy timer when the value of the fast dormancy timer differs from the preferred fast dormancy timer value.

3. The method as recited in claim 2, wherein the preferred fast dormancy timer value is linearly proportional to the successive time interval count, when the successive time interval count is a positive valued integer.

4. The method as recited in claim 2, wherein the preferred fast dormancy timer value is exponentially proportional to the successive time interval count, when the successive time interval count is a positive valued integer.

5. The method as recited in claim 4, wherein the preferred fast dormancy timer value equals a default value raised to a power of the successive time interval count.

6. The method as recited in claim 2, wherein the preferred fast dormancy timer value equals a default value plus a constant value multiplied by the successive time interval count.

7. The method as recited in claim 2, wherein changing the value of the fast dormancy timer includes increasing the fast dormancy timer value toward the preferred fast dormancy timer value more rapidly than decreasing the fast dormancy timer value toward the preferred fast dormancy timer value.

8. A mobile wireless device for communication with a wireless network, the mobile wireless device comprising:
   a processor configured at least to request release of a connection with the wireless network;
   a wireless transceiver, in data communication with the processor, configured to facilitate the communication with and transmit a release request to the wireless network; and
   logic in data communication with the processor and the wireless transceiver, the logic configured to cause the mobile wireless device to:
   monitor data activity;
   increase a value of a fast dormancy timer when the data activity increases; and
   decrease the value of the fast dormancy timer when the data activity decreases;
   wherein the value of the fast dormancy timer is configured to determine a period of data inactivity after which the mobile wireless device requests termination of the connection with the wireless network; and
   wherein the wireless transceiver is further configured to ignore the release request to release the connection during transmission of a high priority signaling message to the wireless network and to notify the processor whether the release request is transmitted.

9. The mobile wireless device as recited in claim 8, wherein the processor is further configured to re-request release of the connection with the wireless network after a received indication that an initial release request was not sent by the transceiver to the wireless network.

10. The mobile wireless device as recited in claim 8, wherein the logic is further configured to cause the mobile wireless device to:
    determine a preferred fast dormancy timer value based on the monitored data activity; and
    change the fast dormancy timer value to the preferred fast dormancy timer value when the fast dormancy timer value differs from the preferred fast dormancy timer value.

11. The mobile wireless device as recited in claim 10, wherein the preferred fast dormancy timer value is related to the monitored data activity linearly.

12. The mobile wireless device as recited in claim 10, wherein the preferred fast dormancy timer value is related to the monitored data activity exponentially.

13. A non-transitory computer medium having at least one program for adaptation of a fast dormancy timer in a wireless device in communication with a wireless network stored thereon, the at least one program configured to, when executed, cause the wireless device to:
    monitor data activity during a series of time intervals;
    determine a number of successive time intervals that include data activity;
    determine a preferred fast dormancy timer value for the wireless device based on the number of successive time intervals that include data activity; and
    change an actual fast dormancy timer value based on the preferred fast dormancy timer value;
    wherein the actual fast dormancy timer is configured to determine a period of data inactivity after which the wireless device requests release of a connection to the wireless network.

14. The non-transitory computer readable medium as recited in claim 13, wherein the preferred fast dormancy timer value is linearly proportional to the number of successive time intervals with data activity, when the number of successive time intervals with data activity is a positive valued integer.

15. The non-transitory computer readable medium as recited in claim 14, wherein the at least one program is further configured to, when executed, cause the wireless device to maintain an exclusion timer at the wireless device during which the wireless device is excluded from transmitting a release request of the connection to the wireless network.

16. A method of adapting a value for a fast dormancy timer in a wireless device in communication with a wireless network, comprising:
in a wireless device:
sensing a period of data inactivity;
starting the fast dormancy timer;
monitoring for data activity and for expiration of the fast dormancy timer;
increasing the value of the fast dormancy timer when the fast dormancy timer expires and a current value of the fast dormancy timer is below a maximum threshold; and
decreasing the value of the fast dormancy timer when data activity occurs before the expiration of the fast dormancy timer and the current value of the fast dormancy timer is above a minimum threshold;
wherein the fast dormancy timer controls when the wireless device requests to release a connection with the wireless network.

17. The method as recited in claim 16, wherein increasing and decreasing the value of the fast dormancy timer includes increasing the value of the fast dormancy timer toward the maximum threshold more slowly than decreasing the value of the fast dormancy timer toward the minimum threshold.

18. A mobile wireless device in communication with a wireless network, comprising:
a processor at least configured to request release of a connection with the wireless network;
a wireless transceiver, in data communication with the processor, configured to facilitate the communication with and transmit a release request to the wireless network at the mobile wireless device; and
logic in data communication with the processor and the wireless transceiver, the logic configured to cause the mobile wireless device to:
monitor data activity;
increase a value of a fast dormancy timer when data activity increases;
decrease the value of the fast dormancy timer when data activity decreases;
determine a preferred fast dormancy timer value based on the monitored data activity; and
change the value of the fast dormancy timer to the preferred fast dormancy time value when the value of the fast dormancy timer differs from the preferred fast dormancy timer value;
wherein the value of the fast dormancy timer determines a period of data inactivity after which the mobile wireless device requests termination of the connection with the wireless network.

19. A non-transitory computer medium having at least one program for adaptation of a fast dormancy timer in a wireless device in communication with a wireless network stored thereon, the at least one program configured to, when executed, cause the wireless device to:
monitor data activity during a plurality of time intervals;
determine a number of successive time intervals that include data activity;
determine a preferred fast dormancy timer value for the wireless device based on the number of successive time intervals that include data activity;
change an actual fast dormancy timer value based on the preferred fast dormancy timer value; and
reduce the actual fast dormancy timer value following a time interval with no data activity.

20. A method of adapting a value for a timer in a wireless device in communication with a wireless network, the method comprising:
in the wireless device:
monitoring data activity at the wireless device;
increasing the value of the timer when data activity increases and a current value of the timer is below a maximum threshold; and
decreasing the value of the timer when data activity decreases and the current value of the timer is above a minimum threshold;
wherein the timer controls when the wireless device requests to release a connection with the wireless network following a period of data inactivity.

* * * * *